United States Patent
Chen

(10) Patent No.: US 10,992,239 B1
(45) Date of Patent: Apr. 27, 2021

(54) SINGLE-STAGE THREE-PHASE HIGH-GAIN BOOST TYPE THREE-PORT INTEGRATED INVERTER

(71) Applicant: Qingdao University, Qingdao (CN)

(72) Inventor: Daolian Chen, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 13 days.

(21) Appl. No.: 16/622,282

(22) PCT Filed: Dec. 6, 2018

(86) PCT No.: PCT/CN2018/000413
§ 371 (c)(1),
(2) Date: Dec. 12, 2019

(87) PCT Pub. No.: WO2020/073145
PCT Pub. Date: Apr. 16, 2020

(30) Foreign Application Priority Data

Oct. 10, 2018 (CN) .......................... 201811176804.1

(51) Int. Cl.
*H02M 7/5387* (2007.01)
*H02J 7/00* (2006.01)
*H02J 7/35* (2006.01)

(52) U.S. Cl.
CPC ......... *H02M 7/5387* (2013.01); *H02J 7/0068* (2013.01); *H02J 7/35* (2013.01)

(58) Field of Classification Search
CPC ........ H02M 7/5387; H02J 7/35; H02J 7/0068; H02J 7/00
See application file for complete search history.

(56) References Cited

FOREIGN PATENT DOCUMENTS

| CN | 102176643 A | 9/2011 |
|---|---|---|
| CN | 202197117 U | 4/2012 |
| JP | 2016092990 A | 5/2016 |

*Primary Examiner* — Robert L Deberadinis
(74) *Attorney, Agent, or Firm* — Bayramoglu Law Offices LLC

(57) ABSTRACT

A single-stage three-phase high-gain boost-type three-port integrated inverter includes a center-tapped energy storage inductor, a three-phase inverter bridge and a three-phase filter, which are successively connected in cascade. A drain terminal and a source terminal of the energy storage switch are respectively connected to the center tap of the energy storage inductor and the negative electrode of an input DC power source. A battery charge/discharge switch unit is connected between a positive electrode of the input DC power source, a positive electrode of a battery and two ends of the center-tapped energy storage inductor. The inverter has three ports, an input port, an output port, and an energy storage port. The inverter has three modes which are the input power supply supplies power to the output load and the battery, the input power supply and battery supply power to the output load, and the battery supplies power to the load.

1 Claim, 14 Drawing Sheets

SINGLE-STAGE THREE-PHASE HIGH-GAIN BOOST TYPE THREE-PORT INTEGRATED INVERTER

CROSS REFERENCE TO THE RELATED APPLICATIONS

This application is the national phase entry of International Application No. PCT/CN2018/000413, filed on Dec. 6, 2018, which is based upon and claims priority to Chinese Patent Application No. 201811176804.1, filed on Oct. 10, 2018, the entire contents of which are incorporated herein by reference.

TECHNICAL FIELD

The present disclosure relates to a single-stage three-phase high-gain boost-type three-port integrated inverter and belongs to the technical field of power electronic conversion.

BACKGROUND

The inverter is a static converter that converts direct-current (DC) electricity into alternating-current (AC) electricity by using a power semiconductor device to supply power for an AC load or to be grid connected with a public grid for power supply.

With the growing scarcity of fossil energy such as petroleum, coal and natural gas, serious environmental pollution, global warming, and nuclear waste and environmental pollution caused by nuclear energy production energy and the environmental challenges have become critical issues facing humanity in the 21st century. Renewable energy sources such as solar, wind, tide and geotherm benefit from the advantages of being clean, pollution-free, low-cost, reliable and having abundant reserves. These benefits have drawn increasing attention in the exploitation and utilization as well as played an important role in the sustainable development of the global economy. The DC electricity converted from the renewable energy sources such as solar, wind, hydrogen, tide and geotherm is usually unstable, so the DC electricity needs to be converted into AC electricity by an inverter for the load to use or to be grid connected with the public grid for power supply. In occasions where the DC generators, batteries, solar cells, fuel cells and wind power generators are used as the main DC power supply in the inversion, the inverters have broad prospective applications.

At present, the circuit structure of a single-stage three-phase buck inverter is usually adopted in the occasions of medium and large capacity inversion and has no energy storage function. Such types of inverters require the voltage of the DC side to be greater than the peak value of the line-to-line voltage of the AC side to work normally, so there is an obvious defect. When the voltage of the DC side (e.g. the output capability of a photovoltaic cell) decreases, for example, in rainy days or nights, the output power of the entire power generation system will be reduced or the system would even stop operating, and the utilization rate of the system will be reduced, which is unable to meet the demand of the load for electricity and is difficult to form an independent power supply system. To solve this problem, the following three solutions are usually used: (1) add a boost DC converter to the first stage of the circuit of the inverter to form a two-stage circuit structure. However, when the duty ratio D is close to the limit value, 1-D is rather small and the adjustment range of D is limited. This solution has some disadvantages, such as poor system dynamic characteristics and decrease in the step-up voltage gain due to the influence of circuit parasitic parameters, making it unsuitable to be applied in the conversion occasions requiring high voltage gain. (2) Add a power frequency transformer to the output circuit. By doing so, the size, weight and cost of the system will be greatly increased, which is not applicable to the current situation where the prices of copper and iron raw materials continue to increase sharply. (3) Adopt a high-frequency transformer to realize electrical isolation and voltage matching, which belongs to two-stage power conversion structure, and the output capacity and application range are limited.

Therefore, it is extremely urgent to find a single-stage three-phase high-gain boost-type three-port integrated inverter having an input port, an output port and an intermediate port for energy storage which is composed of a charging/discharging switch unit of the battery, and a photovoltaic power generation system thereof. This purpose is of great significance to overcome the defects that the single-stage three-phase buck-type inverter cannot be directly applied in the three-phrase boost-type inversion and cannot meet the demand of the load for electricity when the output capability of the input DC power source of the inverter is reduced. This purpose also plays an important role in improving the overload capability, short circuit capability, and service life of the inverter, reducing the electromagnetic interference at the input DC side, improving the theory of inversion technology in the field of power electronics, promoting the development of renewable energy power generation industry, and developing an energy-saving and economical society.

SUMMARY

The objective of the present disclosure is to provide a single-stage three-phase high-gain boost-type three-port integrated inverter with the advantages of high voltage gain, single-stage power conversion, high conversion efficiency, low cost, high reliability in the event of overload and short circuit, large or middle level output capacity, and having an input port, an output port and an intermediate port for energy storage which is composed of a charging/discharging switch unit of the battery.

The technical solution of the present disclosure is as follows. A single-stage three-phase high-gain boost-type three-port integrated inverter includes a center-tapped energy storage inductor, a three-phase inverter bridge, and a three-phase filter. The center-tapped energy storage inductor, the three-phase inverter bridge, and the three-phase filter are successively connected in cascade. A drain terminal and a source terminal of the energy storage switch are respectively connected to a center tap of the energy storage inductor and the negative electrode of an input DC power source. A battery charging/discharging switch unit is connected between a positive electrode of the input DC power source, a positive electrode of a battery and two ends of the center-tapped energy storage inductor. The battery charging/discharging switch unit includes a charging subcircuit switch, a discharging subcircuit switch, and a blocking diode. An anode and a cathode of a charging subcircuit diode are respectively connected to a right end of the center-tapped energy storage inductor and a drain terminal of the charging subcircuit switch. A source terminal of the charging subcircuit switch is connected to a drain terminal of the discharging subcircuit switch and a positive electrode of the battery. A source terminal of the discharging subcircuit switch is connected to a cathode of the blocking diode and a left end of the center-tapped energy storage inductor. An anode of the blocking diode is connected to the positive electrode of the input DC power source. A negative electrode of the battery is connected to the negative electrode of the input DC power source. The blocking diode is configured to avoid a short circuit between the battery and the input DC power source circuit when the discharging subcircuit switch is turned on, and a terminal voltage $U_b$ of the battery is greater than a voltage $U_i$ of the input DC power source. The voltage $U_i$ of the input DC power source or the terminal voltage $U_b$ of the battery, a left part inductor $L_1$ of the center-tapped energy storage inductor L and the energy storage switch form a magnetizing loop. The voltage $U_i$ of the input DC power source or the terminal voltage $U_b$ of the battery, the center-tapped energy storage inductor L, anyone of the line-to-line voltage loops of the three-phase inverter bridge having an instantaneous value of a line-to-line voltage not less than ($\sqrt{6}/2)U_p$ or the charging subcircuit switch, and the battery form a demagnetizing loop. $U_p$ is an RMS line-to-neutral voltage of a three-phase output. The three-phase inverter bridge includes two-quadrant power switches configured to withstand bidirectional voltage stress and unidirectional current stress. A maximum voltage gain of the inverter is $(1+dN_2/N_1)/(1-d)$, wherein, d is a duty ratio of the inverter varying according to the sine law, and $N_1$ and $N_2$ respectively are the number of turns of the left part and the right part windings of the center-tapped energy storage inductor L. The inverter has an input port, an output port, and an intermediate port for energy storage composed of the charging/discharging switch unit of the battery. The inverter has three power supply modes. Mode 1 is the input DC power source supplies power to the output load and the battery. Mode 2 is the input DC power source and the battery supply power to the output load. Mode 3 is the battery supplies power to the load. The first mode, the second mode and the three mode are respectively equivalent to a single-input double-output converter, a double-input single-output inverter with parallel connection and time-phased supplying power and a single-input single-output inverter. The inverter employs an energy management control strategy including a master-slave load sharing for the photovoltaic cell and battery, a double-loop improved separate zone SPWM with an outer RMS output voltage loop of the inverter with a maximum power point tracking of photovoltaic cells and an inner current loop of the energy storage inductor, and the system can be switched smoothly and seamlessly among the three power supply modes.

The present disclosure constructs "the circuit structure of a single-stage three-phase high-gain boost-type three-port integrated inverter which is constituted by successively cascading the center-tapped energy storage inductor, the three-phase inverter bridge, and the three-phase filter, wherein, the drain terminal and the source terminal of the energy storage switch are respectively connected to the center tap of the energy storage inductor and the negative electrode of the input DC power source, and the battery charging/discharging switch unit is connected between the positive electrodes of the input DC power source and battery and two ends of the center-tapped energy storage inductor" based on "the circuit structure of a conventional single-stage three-phase buck-type two-port inverter which is constituted by successively cascading a three-phase inverter bridge and a three-phase LC filter". Namely, by configuring an inductor $L_1$ for the energy storage loop with an inductance smaller than the inductance of the inductor L (corresponding to the windings $N_1+N_2$) for the energy releasing circuit, the voltage boosting with a high voltage gain of the inverter can be achieved. By integrating the charging/discharging switch unit of the battery and adding an intermediate port for energy storage, the three power supply modes can be achieved. Namely, in mode 1, the input DC power source supplies power to the output load and the battery. In mode 2, the input DC power source and the battery supply power to the output load and in mode 3, the battery supplies power to the load.

The present disclosure can convert unstable and low-quality DC electricity with low amplitude into stable and high-quality three-phase output sinusoidal AC electricity with high amplitude, and has the advantages of having three ports, single-stage power conversion, high power density, high conversion efficiency, high voltage gain, low distortion of output waveform, high reliability in the event of overload and short circuit, long service life, and low cost. Thus it is suitable for the occasions of medium and large capacity three-phase boost inversion, especially for an independent photovoltaic power supply system. With the presence of the novel devices such as the IGBT capable of bidirectional blocking, such type of inverter no longer needs to be serially connected with a diode and solves the problem of diode loss.

DETAILED DESCRIPTION OF THE EMBODIMENTS

Figure 1:
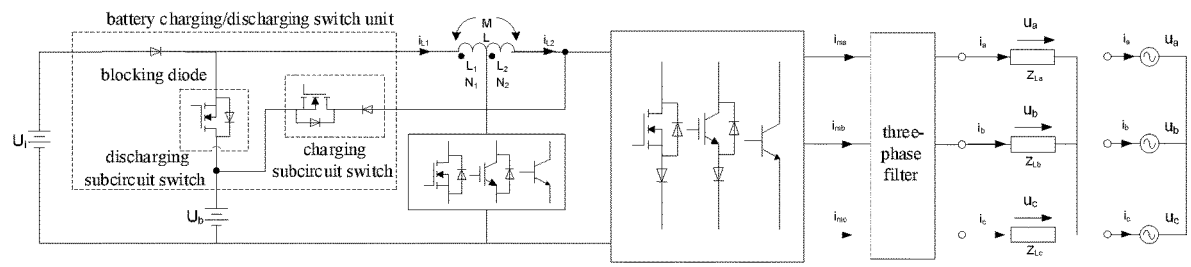
FIG. 1 shows a circuit structure of the single-stage three-phase high-gain boost-type three-port integrated inverter in which the energy storage inductor is at the positive end of the input DC bus.

The technical solution of the present disclosure is further described below with reference to the drawings and embodiments.

A single-stage three-phase high-gain boost-type three-port integrated inverter includes a center-tapped energy storage inductor, a three-phase inverter bridge, and a three-phase filter. The center-tapped energy storage inductor, the three-phase inverter bridge, and the three-phase filter are successively connected in cascade. A drain terminal and a source terminal of the energy storage switch are respectively connected to a center tap of the energy storage inductor and the negative electrode of an input DC power source. A battery charging/discharging switch unit is connected between the positive electrodes of the input DC power source and the battery and two ends of the center-tapped energy storage inductor. The battery charging/discharging switch unit includes a charging subcircuit switch, a discharging subcircuit switch, and a blocking diode. An anode and a cathode of a charging subcircuit diode are respectively connected to a right end of the center-tapped energy storage inductor and a drain terminal of the charging subcircuit switch. A source terminal of the charging subcircuit switch is connected to a drain terminal of the discharging subcircuit switch and a positive electrode of the battery. A source terminal of the discharging subcircuit switch is connected to a cathode of the blocking diode and a left end of the center-tapped energy storage inductor. An anode of the blocking diode is connected to the positive electrode of the input DC power source. A negative electrode of the battery is connected to the negative electrode of the input DC power source. The blocking diode is configured to avoid a short circuit between the battery and the input DC power source circuit when the discharging subcircuit switch is turned on, and a terminal voltage $U_b$ of the battery is greater than a voltage $U_i$ of the input DC power source. The voltage $U_i$ of the input DC power source or the terminal voltage $U_b$ of the battery, a left part inductor $L_1$ of the center-tapped energy storage inductor L, and the energy storage switch form a magnetizing loop. The voltage $U_i$ of the input DC power source or the terminal voltage $U_b$ of the battery, the center-tapped energy storage inductor L, anyone of the line-to-line voltage loops of the three-phase inverter bridge having an instantaneous value of a line-to-line voltage not less than ($\sqrt{6}/2)U_p$ or the charging subcircuit switch, and the battery form a demagnetizing loop. $U_p$ is an RMS line-to-neutral voltage of a three-phase output. The three-phase inverter bridge includes two-quadrant power switches configured to withstand bidirectional voltage stress and unidirectional current stress. A maximum voltage gain of the inverter is $(1+dN_2/N_1)/(1-d)$, wherein, d denotes a duty ratio of the inverter varying according to the sine law, and $N_1$ and $N_2$ respectively denote the number of turns of the left part and the right part windings of the center-tapped energy storage inductor L. The inverter has an input port, an output port, and an intermediate port for energy storage composed of the charging/discharging switch unit of the battery. The inverter has three power supply modes. Mode 1 is the input DC power source supplies power to the output load and the battery. Mode 2 is the input DC power source and the battery supply power to the output load, and mode 3 is the battery supplies power to the load. The inverter employs an energy management control strategy including a master-slave load sharing for the photovoltaic cell and a battery, a double-loop improved separate zone SPWM with an outer RMS output voltage loop of the inverter with a maximum power point tracking of photovoltaic cells and an inner current loop of the energy storage inductor, and the system can be switched smoothly and seamlessly among the three power supply modes.

Figure 2:
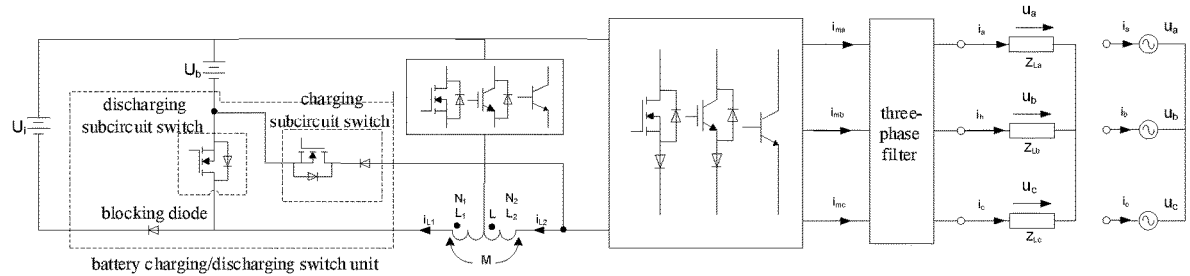
FIG. 2 shows a circuit structure of the single-stage three-phase high-gain boost-type three-port integrated inverter in which the energy storage inductor is at the negative end of the input DC bus.
Figure 3:
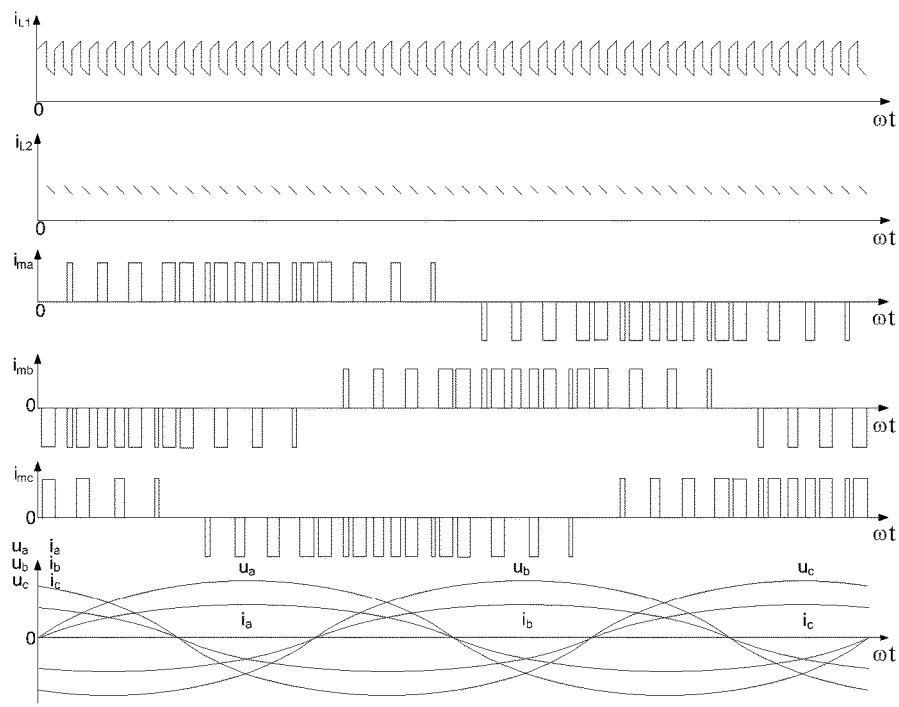
FIG. 3 shows the waveforms according to the principle of the single-stage three-phase high-gain boost-type three-port integrated inverter.

The circuit structure and principle waveforms of the single-stage three-phase high-gain boost-type three-port integrated inverter are shown in FIGS. 1, 2 and 3. In FIGS. 1, 2 and 3, $U_i$ is the voltage of the input DC power source. $U_b$ is the voltage of the battery. $N(N=N_1+N_2)$ is the number of turns of the winding of the entire energy storage inductor. $N_1$ is the number of turns of the winding on the left part of the center tap of the energy storage inductor and $N_2$ is the number of turns of the winding on the right part of the center tap of the energy storage inductor. L, $L_1$, and $L_2$ are the inductance values corresponding to N, $N_1$, and $N_2$, respectively. $M=r\sqrt{L_1L_2}$ is the mutual inductance between $L_1$ and $L_2$ (r is the coupling coefficient between windings $N_1$ and $N_2$). $Z_{La}$, $Z_{Lb}$, $Z_{Lc}$ respectively denote the three-phase output impedance of passive load and $u_a$, $u_b$, $u_c$ respectively denote the line-to-neutral voltages of the three-phase output impedance of passive load or the voltages of the three-phase AC grid. The working principle and performance of the two circuit structures shown in FIGS. 1 and 2 are identical, except some fine differences on the circuit connections. When the center-tapped energy storage inductor is at the positive end of the input DC bus, an energy storage switch is connected between the center tap of the energy storage inductor and the negative end of the input DC power source. The blocking diode is connected to the positive DC bus in series, and the battery and the input DC power source have the same negative end. When the center-tapped energy storage inductor is at the negative end of the input DC bus, an energy storage switch is connected between the center tap of the energy storage inductor and the positive end of the input DC power source, the blocking diode is connected to the negative DC bus in series, and the battery and the input DC power source have the same positive end.

The energy storage switch in the two circuit structures is composed of MOSFET or IGBT, GTR and other power devices. The three-phase inverter bridge includes a plurality of two-quadrant power switches configured to withstand bidirectional voltage stress and unidirectional current stress. The three-phase filter is a three-phase filter with a capacitor or a three-phase filter with a capacitor and an inductor. The three-phase output end can be connected to the three-phase AC passive load $Z_{La}$, $Z_{Lb}$, $Z_{Lc}$, or can be connected to the three-phase AC grid $u_a$, $u_b$, $u_c$. An input filter may be or may not be set between the input DC power source $U_i$ and the blocking diode. The ripple of the input DC current can be suppressed by setting the input filter. Taking the power supply mode 1 in which the input DC power source $U_i$ supplies power to the output AC load and the battery as an example, when the energy storage switch is turned on, the input DC power source $U_i$ magnetizes the energy storage inductor L1, and the three-phase AC load $Z_{La}$, $Z_{Lb}$, $Z_{Lc}$ or the three-phase AC grid $u_a$, $u_b$, $u_c$ rely on the three-phase filter to maintain the power supply. When the energy storage switch is turned off, the energy storage inductor L1 is demagnetized and works with the input DC power source Ui to supply power to the corresponding two-phase AC load (or AC grid) and the battery during different time periods. The energy storage switch modulates the input DC power source Ui into rippled high-frequency pulsed DC currents $i_{L1}$, $i_{L2}$ which are then inverted into the tri-state modulated currents $i_{ma}$, $i_{mb}$, $i_{mc}$ by the three-phase inverter bridge. After the three-phase filtering, the high-quality three-phase sinusoidal voltages $u_a$, $u_b$, $u_c$ can be obtained at the three-phase AC load (or the high-quality three-phase sinusoidal currents waves $i_a$, $i_b$, $i_c$ can be obtained at the three-phase AC grid), or the $i_{L2}$ charges the battery $U_b$ through the charging subcircuit switch. It should be added that, at the moment when the energy storage switch is turned on or turned off, the magnetic potential of the windings N of the entire energy storage inductor is equal to the magnetic potential of the left part windings N1 of the energy storage inductor.

Figure 4:
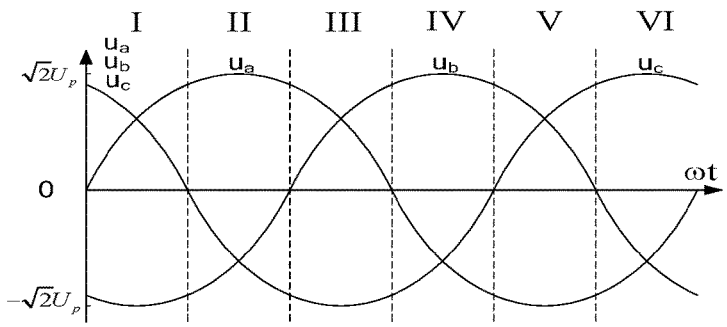
FIG. 4 shows six 60-degree intervals of the three-phase output voltage in a low-frequency output period.
Figure 5:
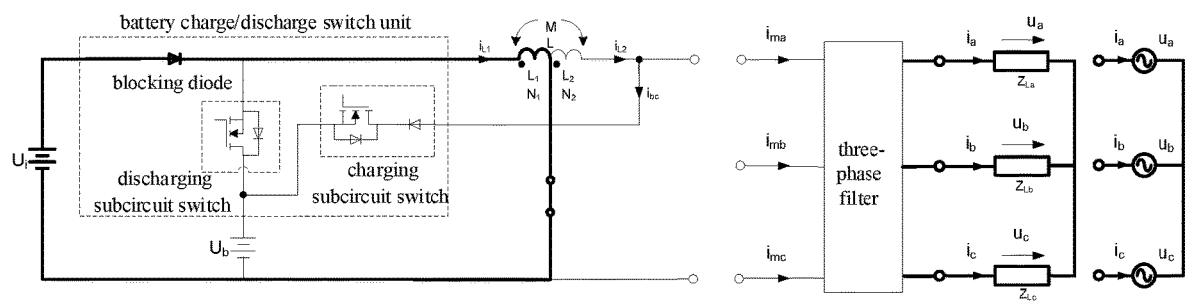
FIG. 5 shows a magnetizing equivalent circuit of the energy storage inductor of the single-stage three-phase high-gain boost-type three-port integrated inverter during the period of $dT_S/2$ in interval I.
Figure 6:
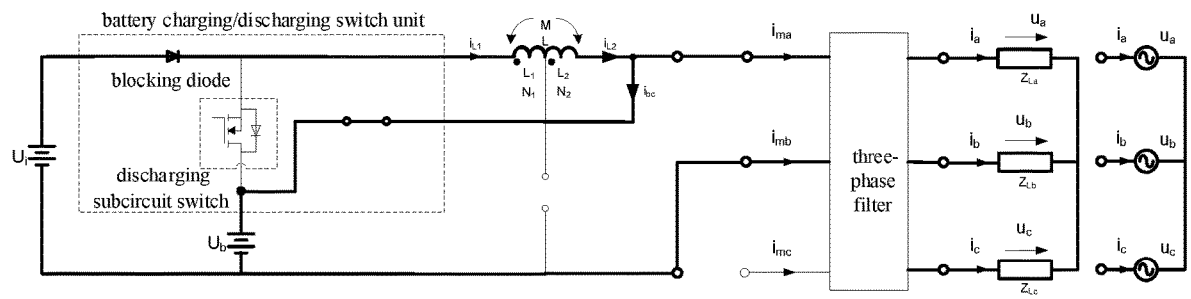
FIG. 6 shows a demagnetizing equivalent circuit of the energy storage inductor of the single-stage three-phase high-gain boost-type three-port integrated inverter during the period of $(1-d)T_S/2$ in interval I passing through the a and b phases.
Figure 7:
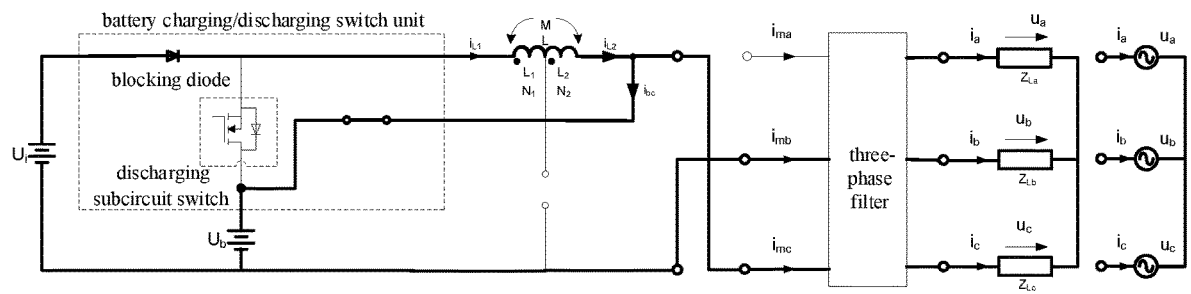
FIG. 7 shows a demagnetizing equivalent circuit of the energy storage inductor of the single-stage three-phase high-gain boost-type three-port integrated inverter during the period of $(1-d)T_S/2$ in interval I passing through the c and b phases.

In order to ensure the quality of the output waveform, the inverter must satisfy the working mechanism of the Boost-type converter. Namely, the energy storage inductor must have both of the opposite processes of magnetization and demagnetization in a high-frequency switching period. Taking the zero value points of the three-phase output instantaneous voltage waveform as the dividing points, a low-frequency output cycle is divided into six 60-degree intervals, as shown in FIG. 4. In FIG. 4, $U_p$ is the effective value of the three-phase output voltage. For any one of the 60-degree intervals, there are always two instantaneous line-to-line voltages not less than $(\sqrt{6}/2)U_p$. For example, in the interval I (0 degree-60 degrees), the line-to-line voltages $u_{ab}$ and $u_{cb}$ are not less than $(\sqrt{6}/2)U_p$, so the input voltage $U_i$ is merely required to be less than $(\sqrt{6}/2)U_p$. The magnetizing and demagnetizing equivalent circuits of the single-stage three-phase high-gain boost-type three-port integrated inverter within a high-frequency switching period shown in FIGS. 5, 6 and 7 are the result of the interval I (0 degree-60 degrees) shown in FIG. 4, the circuit structure shown in FIG. 1, the power supply mode 1 in which the input DC power source $U_i$ supplies power to the output AC load and the battery. Let the high-frequency switching period of the three-phase inverter bridge be $T_S$, then the switching period of the energy storage switch is $T_S/2$, and the duty ratio d of the on-time $T_{on}$ of the energy storage switch in $T_S/2$ is $d=T_{on}/(T_S/2)$. The energy storage inductor is magnetized twice within a high-frequency switching period $T_S$, and is respectively demagnetized once through the loop of the a and b phases and the battery charging subcircuit and once through the loop of the c and b phases and the battery charging subcircuit, so as to ensure that the input DC power source evenly supplies power to the three-phase output load and to realize the magnetic reset of the energy storage inductor. Obviously, the duty ratios of the energy storage inductor corresponding to the two magnetization processes in one $T_S$ must differ from each other. The following equations can be obtained according to the magnetizing equivalent circuit during the $dT_S/2$ shown in FIG. 5, $$U_i = N_1 \frac{\Delta\varphi_+}{dT_s/2}. \tag{1}$$

According to the demagnetizing equivalent circuit during the period of $(1-d)T_S/2$ shown in FIG. 6, if the demagnetization is performed only through the loop of the a and b phases during this period, then, $$u_{ab} - U_i = (N_1 + N_2)\frac{\Delta\varphi_-}{(1-d)T_s/2}. \tag{2}$$

In fact, the demagnetization is performed through the loop of the a and b phases and the charging subcircuit circuit of the battery during different time periods. Therefore, in the steady state, $\Delta\varphi_- \leq \Delta\varphi_+$, and the maximum voltage gain can be obtained according to equations (1) and (2) as below, $$u_{ab}/U_i \leq (1+dN_2/N_1)/(1-d) \tag{3}.$$

Similarly, the maximum voltage gain can be deduced as $$u_{cb}/U_i = u_{ac}/U_i \leq (1+dN_2/N_1)/(1-d) \tag{4}.$$

In equations (1), (2), (3) and (4), $U_i$ is the voltage of input DC power source, and $N_1$ and $N_2$ respectively are the number of turns of the left part windings and right part windings of the center-tapped energy storage inductor L. The maximum voltage gain $(1+dN_2/N_1)/(1-d)$ of the inverter is always greater than 1, and greater than the voltage gain $1/(1-d)$ of the traditional boost-type inverter. The voltage gain of the inverter is improved by configuring the energy storage loop with the inductance $L_1$ (corresponding to the windings $N_1$) less than the inductance L (corresponding to the windings $N_1+N_2$) of the energy releasing loop. By integrating the charging/discharging switch unit of the battery with an intermediate port for energy storage, three power supply modes can be achieved. Therefore, the inverter is called a single-stage three-phase high-gain boost-type three-port integrated inverter. The voltage gain can be adjusted by adjusting the position of the center tap of the energy storage inductor (i.e. adjusting the number of turns $N_1$ and $N_2$ of the windings) and the duty ratio of the inverter.

The inverter of the present disclosure has the circuit structure of the single-stage three-phase high-gain boost-type three-port integrated inverter, in which the voltage gain of the inverter is improved by configuring the energy storage loop with the inductance $L_1$ (corresponding to the windings $N_1$) less than the inductance L (corresponding to the windings $N_1+N_2$) of the energy releasing loop and by integrating the charging/discharging switch unit of the battery with an intermediate port for energy storage. The inverter of the present disclosure is essentially different from the circuit structure of the single-stage three-phase buck-type inverter. Therefore, the inverter of the present disclosure is novel and creative, and has the advantages of having three ports, high conversion efficiency (standing for low energy loss), high power density (standing for small volume and light weight), high voltage gain (which means that lower DC voltage can be converted into higher AC voltage), low cost, and wide applications. The inverter of the present disclosure is an ideal energy-saving and consumption-reducing three-phase inverter, which is of great value in today's vigorous promotion of building an energy-saving and economical society.

Figure 8:
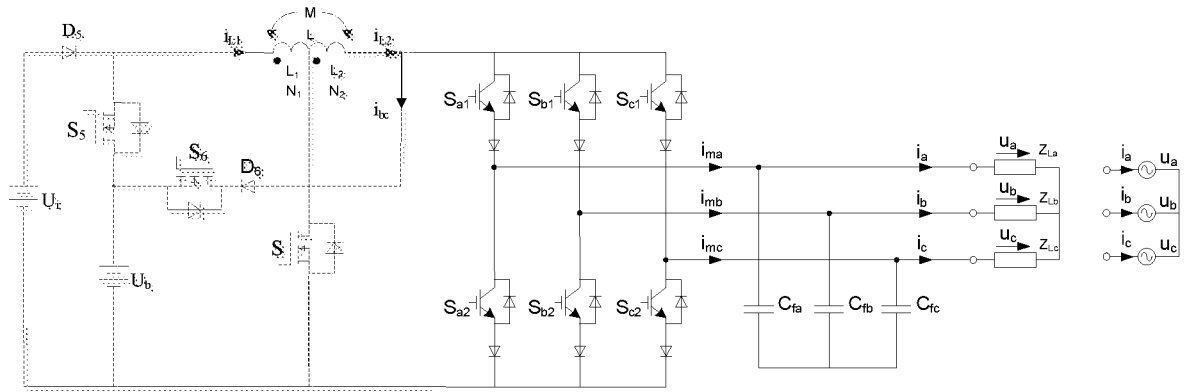
FIG. 8 shows the first embodiment of the topology of the single-stage three-phase high-gain boost-type three-port integrated inverter in a the schematic diagram of a three-phase filter circuit with capacitor.
Figure 9:
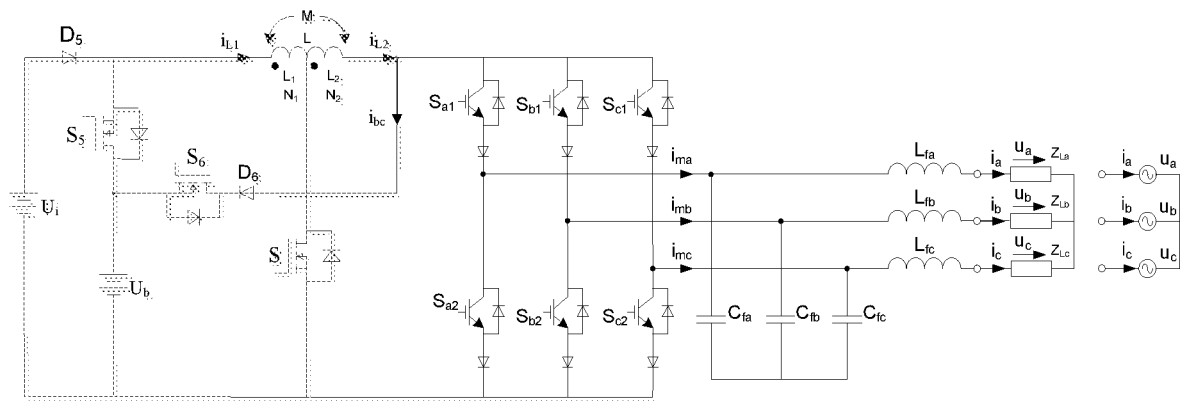
FIG. 9 shows the second embodiment of the topology of the single-stage three-phase high-gain boost-type three-port integrated inverter in a the schematic diagram of a three-phase filter circuit with capacitor and inductor.

Taking the circuit structure shown in FIG. 1 as an example, embodiments of the circuit topology of the single-stage three-phase high-gain boost-type three-port integrated inverter are shown in FIGS. 8 and 9. FIG. 8 shows the filter circuit with a capacitor, which is suitable for the occasions of inversion where the quality requirement for the output waveform is not very strict. FIG. 9 shows the filter circuit with a capacitor and an inductor, which is suitable for the occasions of inversion where the quality requirement for output waveform is strict. In the circuits shown in FIGS. 8 and 9, the input DC power source $U_i$ is the input port, the three-phase output AC load $Z_{La}$, $Z_{Lb}$, $Z_{Lc}$ or the three-phase AC grid ua, ub, uc are the output ports. The battery Ub is the intermediate port for energy storage. The terminal voltage of the battery Ub is greater than Ui. $S_6$、$D_6$ are the charging subcircuit switches of the battery. $S_5$ is the discharging subcircuit switch of the battery. $D_5$ is the blocking diode. The energy storage switch S may be a MOSFET device, or an IGBT, GTR or other devices. The three-phase inverter bridge may be an IGBT device, or a MOSFET, GTR or other devices. The six switches $S_{a1}$, $S_{b1}$, $S_{c1}$, $S_{a2}$, $S_{b2}$, $S_{c2}$ of the three-phase inverter bridge are respectively serially connected with one blocking diode in the forward direction to form six two-quadrant power switches configured to withstand bidirectional voltage stress and unidirectional current stress, thereby avoiding short circuit of the capacitor of the three-phase AC filter when the inverter bridge is in operation. With the presence of new devices such as IGBT capable of bidirectional blocking, the inverter no longer needs to be connected with a diode in series, which solves the problem of diode loss. The inverter of the present disclosure can convert the unstable low-voltage DC electricity (e.g. the electricity from the sources such as batteries, photovoltaic cells, and fuel cells) into a desired, stable, high-quality, high-voltage three-phase sinusoidal AC electricity. Thus, the inverter of the present disclosure can be widely used in the inverter power sources for civil use (e.g. communication inverter and photovoltaic grid-connected inverter 24 VDC/380V50 HzAC, 48 VDC/380V50 HzAC, 96 VDC/380V50 HzAC) and the inverter power sources for national defense use (e.g. aviation static inverter 27 VDC/200V400 HzAC) in medium and large capacity, voltage step-up occasions.

Figure 10:
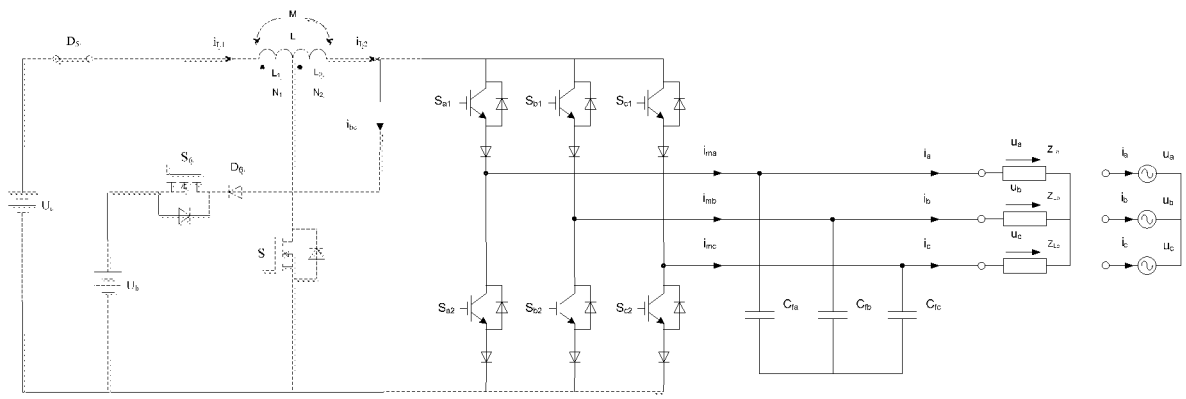
FIG. 10 shows an equivalent circuit of the single-stage three-phase high-gain boost-type three-port integrated inverter in power supply mode 1 in which the power flows from the input port to the output port and the intermediate port.
Figure 11:
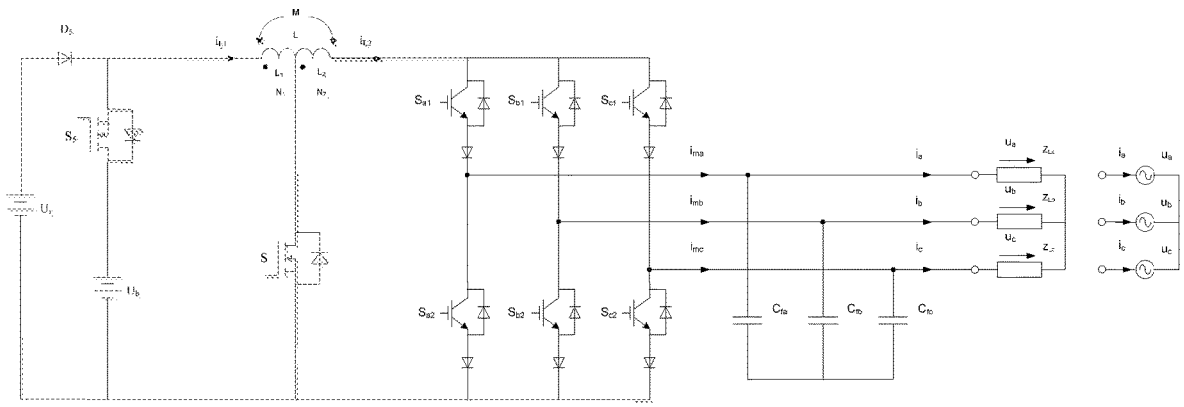
FIG. 11 shows an equivalent circuit of the single-stage three-phase high-gain boost-type three-port integrated inverter in power supply mode 2 in which the power flows from the input port and the intermediate port to the output port.
Figure 12:
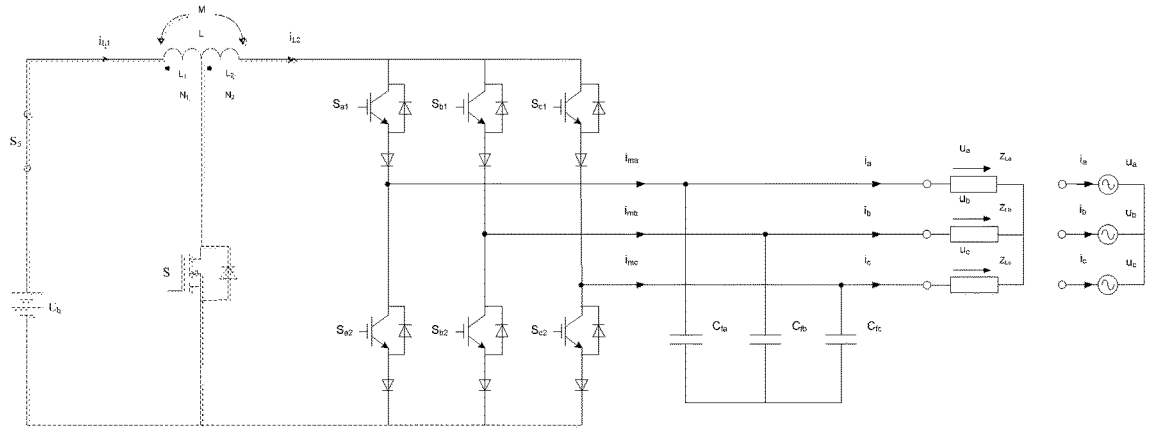
FIG. 12 shows an equivalent circuit of the single-stage three-phase high-gain boost-type three-port integrated inverter in power supply mode 3 in which the power flows from the intermediate port to the output port.

Taking the capacitor filter circuit shown in FIG. 8 as an example, the single-stage three-phase high-gain boost-type three-port integrated inverter has three power supply modes, as shown in FIGS. 10, 11 and 12. In power supply mode 1 shown in FIG. 10, the power flows from the input port to the output port and the intermediate port, which is equivalent to a single-input double-output converter. In power supply mode 2 shown in FIG. 11, the power flows from the input port and the intermediate port to the output port, which is equivalent to a double-input single-output inverter with parallel connection and time-phased supplying power. In power supply mode 3 shown in FIG. 12, the power flows from the intermediate port to the output port, which is equivalent to a single-input single-output inverter.

Figure 13:
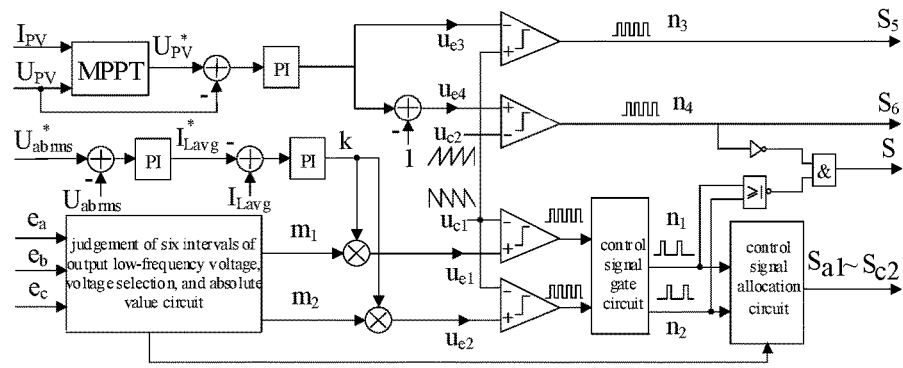
FIG. 13 is a block diagram of the energy management and control including a master-slave load sharing for the photovoltaic cell and battery, a double-loop improved separate zone SPWM with an outer RMS output voltage loop of the inverter with a maximum power point tracking of photovoltaic cells and an inner current loop of the energy storage inductor, and the system can be switched smoothly and seamlessly among the three power supply modes.
Figure 14:
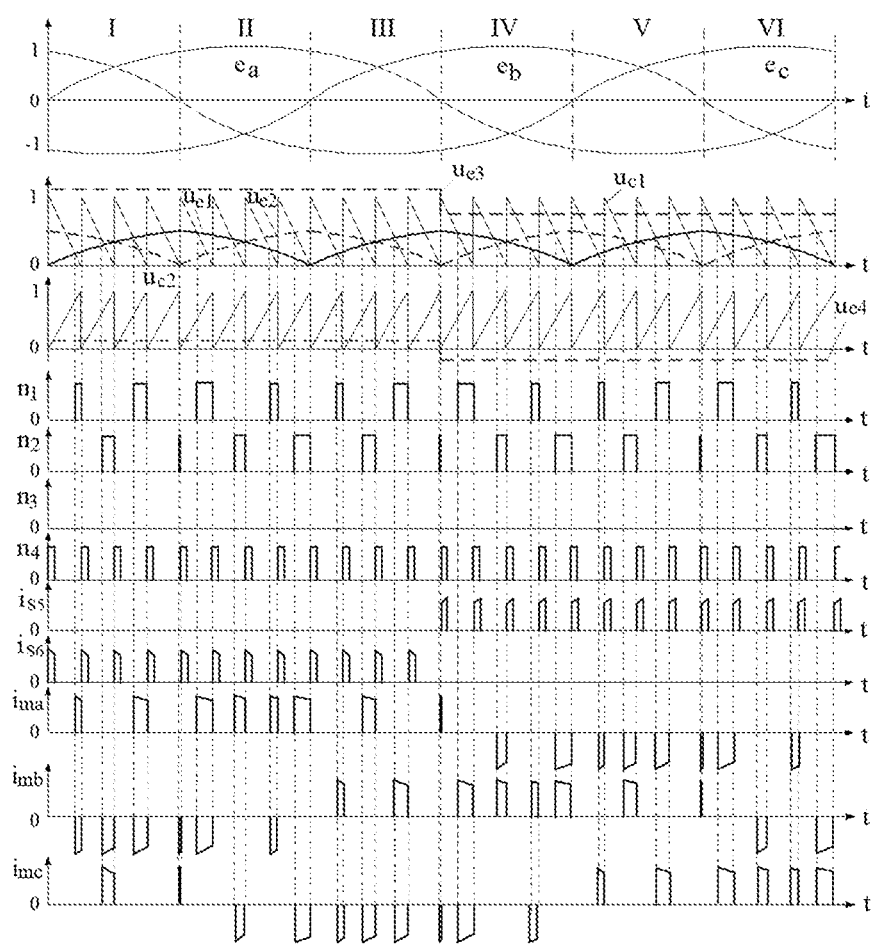
FIG. 14 shows the waveforms according to the principle of the energy management and control having a master-slave load sharing for the photovoltaic cell and battery and a double-loop improved separate zone SPWM with an outer RMS output voltage loop of the inverter with a maximum power point tracking of photovoltaic cells and an inner current loop of the energy storage inductor within the first half of the low-frequency period in the power supply mode 1 and the latter half of the low-frequency period in the power supply mode 2.

The energy management and control strategy for the independent power supply system of the single-stage three-phase high-gain boost-type three-port photovoltaic integrated inverter needs to meet the requirements of the characteristics of the ports of the photovoltaic cell, the battery, and the electrical load. Namely, the functions including master-slave load sharing of the photovoltaic cell and battery, the photovoltaic power generation MPPT of the input port, and stabilization of output voltage need to be achieved. As shown in FIGS. 13 and 14, the energy management and control strategy includes a master-slave load sharing for the photovoltaic cell and battery, a double-loop improved separate zone SPWM with an outer RMS output voltage loop of the inverter with a maximum power point tracking of photovoltaic cells and an inner current loop of the energy storage inductor, and the system can be switched smoothly and seamlessly among the three power supply modes is employed. The waveform of the first half low-frequency period in FIG. 14 is the waveform of power supply mode 1, and the waveform of the second half low-frequency period in FIG. 14 is the waveform of power supply mode 2. The control signals of the intervals within one low-frequency output cycle of the inverter are shown in Table 1. Taking the reference voltages $e_a$, $e_b$ and $e_c$ as separate zone signals, after the judgement of the six intervals of the output low-frequency voltage, the voltage selection, and the absolute value circuit, the interval reference sinusoidal signals $m_1$, $m_2$ are obtained. Detecting and feeding back the energy storage inductor current signals $i_L$ and $i_{L2}$, and converting $i_{L2}$ into $i_{L1}$, the energy storage inductor current signal $i_L=(i_{L1}+N_2/N_1 i_L 2)$ (let the sampling coefficient of the inductor current be 1), so the continuity of the sampling current within a switching period is ensured. The double-loop control includes an outer loop of feedback of effective value of output voltage and an inner loop of energy storage inductor current. The double-loop control is realized by the output RMS voltage feedback outer loop and the energy storage inductor inner current loop. Namely, the effective value $U_{abrms}$ of the output line-to-line voltage is compared with the effective reference value $U^*_{abrms}$ of the line-to-line voltage, and the energy storage inductor average current reference signal $I^*_{Lavg}$ is obtained after PI regulator. The energy storage inductor average current signal $I_{Lavg}$ is compared with $I^*_{Lavg}$ and amplified to obtain the modulation degree k, and the modulation wave signals $u_{e1}=km_1$, $u_{e2}=km_2$. Let $|Z_{La}|=|Z_{Lb}|=|Z_{Lc}|=|Z_L|$, then the three-phase output phase-to-neutral voltage satisfies the following condition $u_a=kI_{Lavg}|Z_L|e_a$, $u_b=kI_{Lavg}|Z_L|e_b$, $u_c=kI_{Lavg}|Z_L|e_c$. Specially, the stability of the energy storage inductor current $I_{Lavg}$ is realized by adjusting the load sharing of the photovoltaic cell and the battery. When the photovoltaic power is greater than the load power, the photovoltaic cells store the remaining energy into the battery to suppress the increase of the energy storage inductor current. When the photovoltaic power is less than the load power, the battery complements the load with the rest of the part of the power to prevent the drop of the energy storage inductor current. It can be seen from FIGS. 13 and 14 that the energy storage switch S operates at a switching frequency equal to the frequency of the carrier waves $u_{c1}$ and $u_{c2}$. However, the six energy releasing switches $S_{a1}$, $S_{a2}$, $S_{b1}$, $S_{b2}$, $S_{c1}$, $S_{c2}$ of the inverter bridge work according to the following switch rules within a low-frequency output cycle. The high-frequency switch works 2/6 low-frequency output cycle, is always turned on 1/6 low-frequency output cycle, and is turned off 3/6 low-frequency output cycle. Obviously, the frequency of the high-frequency switch of the six energy releasing switches is 1/2 that of the energy storage switch S.

TABLE 1 the separate zone control signals of the inverter within a low-frequency output cycle

| | | | signal | | | | | | | | |
|---|---|---|---|---|---|---|---|---|---|---|---|
| interval | $m_1$ | $m_2$ | $S_{a1}$ | $S_{a2}$ | $S_{b1}$ | $S_{b2}$ | $S_{c1}$ | $S_{c2}$ | $S_1$ | $S_2$ | $S_0$ |
| I | $e_a$ | $e_c$ | $n_1$ | 0 | 0 | 1 | $n_2$ | 0 | $n_3$ | $n_4$ | $\overline{n_1 + n_2}$ & $\overline{n_4}$ |
| II | $-e_b$ | $-e_c$ | 1 | 0 | 0 | $n_1$ | 0 | $n_2$ | | | |
| III | $e_b$ | $e_a$ | $n_1$ | 0 | $n_2$ | 0 | 0 | 1 | | | |
| IV | $-e_c$ | $-e_a$ | 0 | $n_2$ | 1 | 0 | 0 | $n_1$ | | | |
| V | $e_c$ | $e_b$ | 0 | 1 | $n_1$ | 0 | $n_2$ | 0 | | | |
| VI | $-e_a$ | $-e_b$ | 0 | $n_1$ | 0 | $n_2$ | 1 | 0 | | | |

The energy management and control strategy realizes the three power supply modes of the integrated inverter. It is known that the power required by the load is mainly supplied by the master power supply device which is the photovoltaic cells, and the rest part of power required by the load is supplied by the slave power supply device which is the battery. Mode 1 is as follows: when the photovoltaic power is greater than the load power, $u_{e3} \geq 1$, $u_{e4} \geq 0$, the discharging switch $S_5$ is turned off, and the charging switch $S_6$ PWM is turned on; the photovoltaic cell stores the remaining energy to the battery, and the photovoltaic cell supplies power to the load and the battery in different time periods within a switching cycle. Mode 2 is as follows: when the photovoltaic power is less than the load power, $u_{e3} < 1$, $u_{e4} < 0$, the discharging switch $S_5$ PWM is turned on, the charging switch $S_6$ is turned off, and the photovoltaic cell and the battery supply power to the load in different time periods within a switching cycle. Mode 3 is as follows: when the photovoltaic cell does not output power, $u_{e3}=0$, the discharging switch $S_5$ is turned on, the battery supplies power to the load independently.

Figure 15:
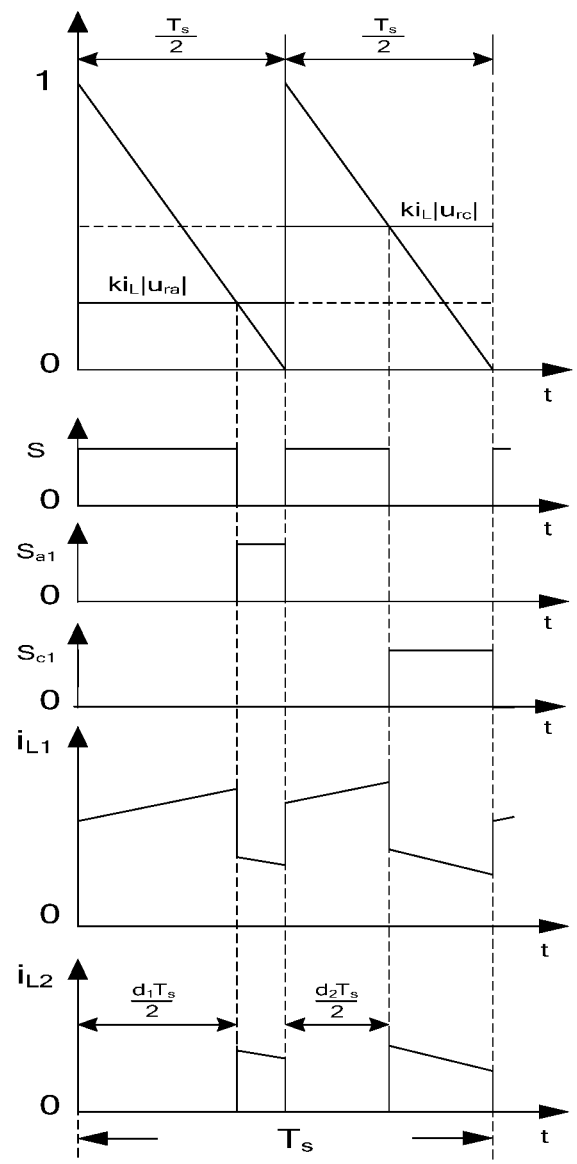
FIG. 15 shows the waveforms according to the principle of the generation of the control signal of the power switch of the single-stage three-phase high-gain boost-type three-port integrated inverter within a low-frequency output period in interval I (0-60 degrees)

FIG. 15 shows the generation of the control signals of the power switch and the waveform of the energy storage inductor current of the single-stage three-phase high-gain boost-type three-port integrated inverter in interval I (0°-60°) of a low-frequency output cycle. The energy storage inductor is magnetized twice within a high-frequency switching period $T_S$, and is respectively demagnetized once through the loop of the a and b phases and once through the loop of the c and b phases. The duty ratios of the energy storage inductor corresponding to the two times of magnetization in one $T_S$ are $d_1$ and $d_2$, respectively, and the duty ratio varies with the reference voltage.

Figure 16:
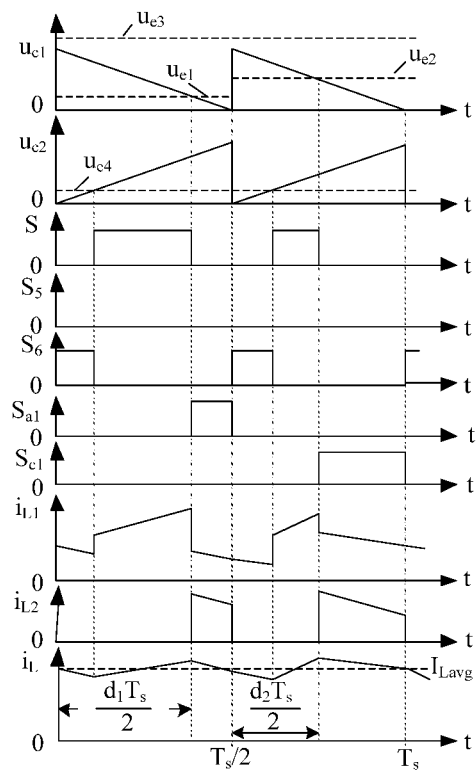
FIG. 16 shows the control signal of the power switch of the single-stage three-phase high-gain boost-type three-port integrated inverter in interval I in power supply mode 1.
Figure 17:
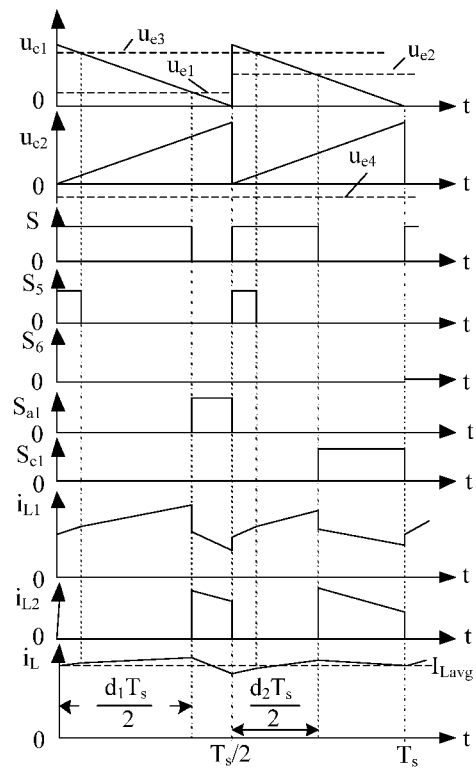
FIG. 17 shows the control signal of the power switch of the single-stage three-phase high-gain boost-type three-port integrated inverter in interval I in power supply mode 2.
Figure 18:
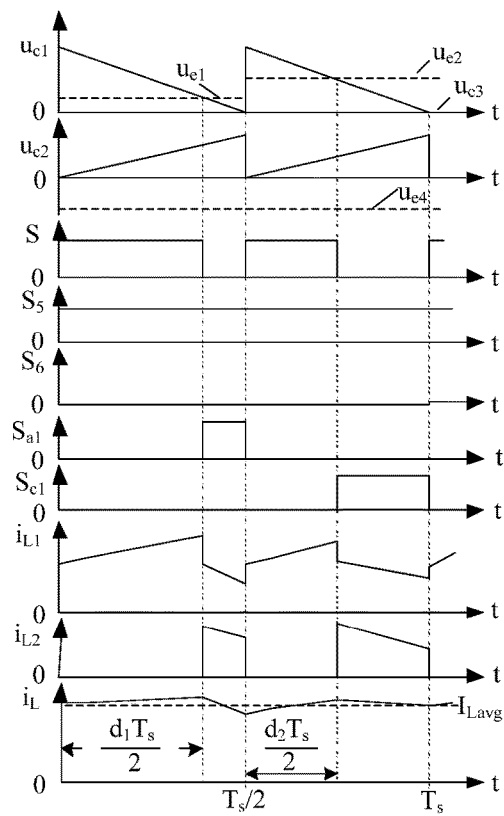
FIG. 18 shows the control signal of the power switch of the single-stage three-phase high-gain boost-type three-port integrated inverter in interval I in power supply mode 3.

Taking the interval I as an example, the control signals of the power switch under three working modes of the inverter are shown in FIGS. 16, 17 and 18. When the inverter is working in mode 1, $u_{e3}$ has no intersection with carrier wave $u_{c1}$, the discharging switch $S_5$ is turned off, $u_{e4}$ intersects with carrier wave $u_{c2}$, and the charging switch $S_6$ PWM is turned on. As the photovoltaic power decreases gradually, $u_{e3}$ and $u_{e4}$ decrease gradually, and the on-time of the charging switch $S_6$ decreases gradually. When $u_{e3}=1$, $u_{e4}=0$, at this time, the photovoltaic power is equal to the load power, the charging switch and the discharging switch are both turned off, and the photovoltaic cell supplies power to the load independently. As the photovoltaic power decreases again, $u_{e3}$ will intersect with carrier wave $u_{c1}$ to obtain the control signal of the discharging switch $S_5$ PWM, and the photovoltaic cell and the battery supplies power to the load in different time periods, where mode 2 is one such example. When the photovoltaic power decreases to zero, $u_{e3}=0$ and $u_{e4}=-1$, at this time, the discharging switch $S_5$ is always turned on, the charging switch $S_6$ is turned off, and the battery supplies power to the load independently, where mode 3 is one such example. When the inverter is working in mode 1, $u_{e3}$ has no intersection with the carrier wave $u_{c1}$, the discharging switch $S_5$ is turned off, $u_{e4}$ intersects with the carrier wave $u_{c2}$, the charging switch $S_6$ PWM is turned on. As the load power increases, $u_{e4}$ decreases gradually, the duty ratio of the charging switch $S_6$ decreases gradually, and the energy storage time of the inductor increases gradually. When $u_{e4}=0$, the photovoltaic power is equal to the load power. As the load power increases further, the charging switch $S_6$ is turned off, the discharging switch $S_5$ PWM is turned on, and the photovoltaic cell and the battery supply power to the load in different time periods, where mode 2 is one such example. It can be seen that the single-stage three-phase high-gain boost-type three-port integrated inverter can realize a smooth and seamless switch from mode 1 to mode 2 to mode 3. Similarly, the inverter also can realize a smooth and seamless switch from mode 3 to mode 2 to mode 1.

Taking the topology of the inverter with three-phase capacitor filter and power supply mode 1 (the power flows from the input port to the output port and the intermediate port) shown in FIG. 8 as an example, the operating modes of the six intervals obtained by dividing a low-frequency output cycle of the inverter are discussed. Each interval contains multiple high-frequency switching periods $T_S$. Each high-frequency switching period has three different equivalent circuits, including the two times of magnetization on the identical loop and the two times of demagnetization on two different loops of the energy storage inductor.

Interval I: the energy releasing switches $S_{a2}$, $S_{b1}$ and $S_{c2}$ are turned off, $S_{b2}$ is turned on, and the state of the switches are in the order of mode I-1, I-2, I-3 and I-4 in each high-frequency switch cycle $T_S$ in this interval.

Figure 19:
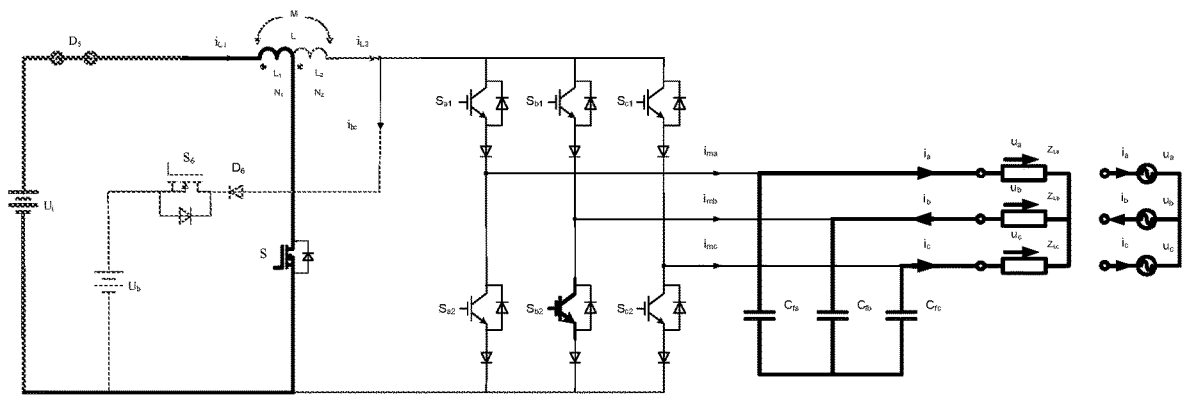
FIG. 19 shows an equivalent circuit of the mode I-1 and mode I-3 of the single-stage three-phase high-gain boost-type three-port integrated inverter in power supply mode 1 where $D_5$, S, $S_{b2}$ are turned on and $S_{a2}$, $S_{b1}$, $S_{c2}$, $S_{a1}$, $S_{c1}$ are turned off.

The mode I-1 is shown in FIG. 19: $D_5$, S, $S_{b2}$ are turned on, $S_{a2}$, $S_{b1}$, $S_{c2}$, $S_{a1}$, $S_{c1}$ are turned off. The voltage source $U_i$, the inductor $L_1$, and the energy storage switch S form a loop. The inductor $L_1$ stores energy. The inductor current $i_{L1}$ rises linearly at the rate $U_i/L_1$. The filter capacitors $C_{fa}$, $C_{fb}$, $C_{fc}$ maintain the load currents $i_a$, $i_b$, $i_c$.

Figure 20:
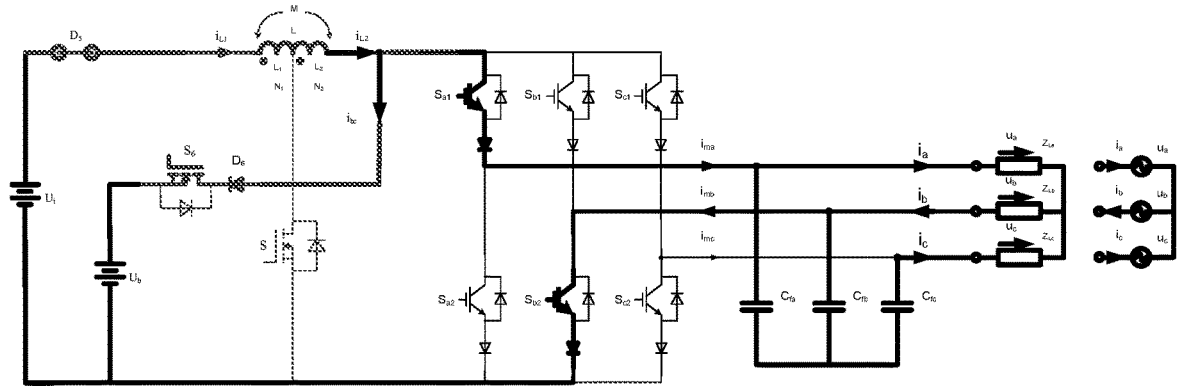
FIG. 20 shows an equivalent circuit of the mode I-2 of the single-stage three-phase high-gain boost-type three-port integrated inverter in power supply mode 1 where $D_5$, $D_6$, $S_6$, $S_{a1}$, $S_{b2}$ are turned on and $S_{a2}$, $S_{b1}$, $S_{c2}$, S, $S_{c1}$ are turned off.

The mode I-2 is shown in FIG. 20: $D_5$, $D_6$, $S_6$, $S_{a1}$, $S_{b2}$ are turned on, $S_{a2}$, $S_{b1}$, $S_{c2}$, S, $S_{c1}$ are turned off. The voltage source $U_i$, the energy storage inductor L, and the energy releasing switches $S_{a1}$ and $S_{b2}$ or the charging subcircuit switch of the battery form a loop, and the inverter transmits energy to the load or charges the battery. If $u_{ab}>U_i$, the inductor current $i_{L2}$ decreases linearly at the rate $(u_{ab}-U_i)/L$ or $(U_b-U_i)/L$, and the inductor releases energy. If $u_{ab}<U_i$, the inductor current $i_{L2}$ increases linearly at the rate $(U_i-u_{ab})/L$, the inductor continues to store energy, and the filter capacitor $C_{fc}$ maintains the load current $i_c$.

Mode I-3 is the same as model-1, as shown in FIG. 19.

Figure 21:
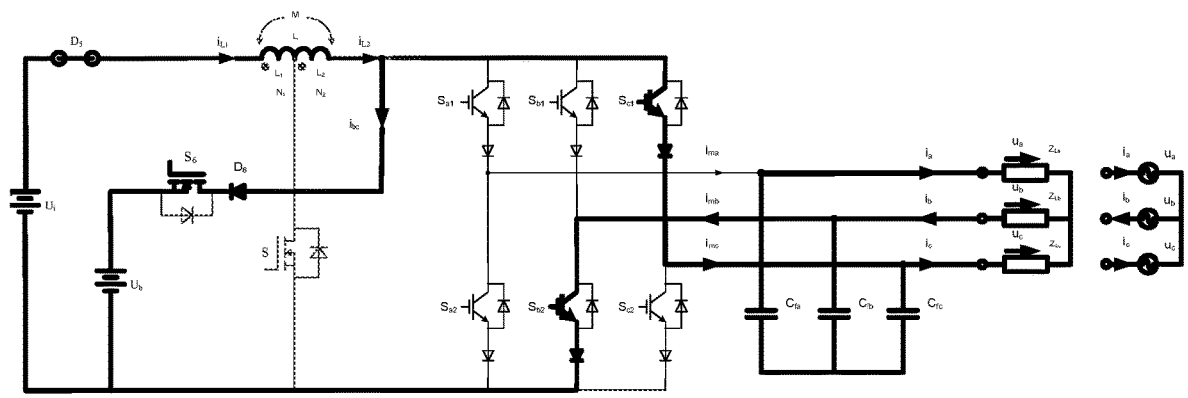
FIG. 21 shows an equivalent circuit of the mode I-4 of the single-stage three-phase high-gain boost-type three-port integrated inverter in power supply mode 1 where $D_5$, $D_6$, $S_6$, $S_{c1}$, $S_{b2}$ are turned on and $S_{a2}$, $S_{b1}$, $S_{c2}$, S, $S_{a1}$ are turned off.

The mode I-4 is shown in FIG. 21: $D_5$, $D_6$, $S_6$, $S_{c1}$, $S_{b2}$ are turned on, $S_{a2}$, $S_{b1}$, $S_{c2}$, S, $S_{a1}$ are turned off. The voltage source $U_i$, the energy storage inductor L, and the energy releasing switches $S_{c1}$ and $S_{b2}$ or the charging subcircuit switch of the battery form a loop, and the inverter transmits energy to the load or charges the battery. If $u_{cb}>U_i$, the inductor current $i_{L2}$ decreases linearly at the rate $(u_{cb}-U_i)/L$ or $(U_b-U_i)/L$, and the inductor releases energy. If $u_{cb}<U_i$, the inductor current $i_{L2}$ increases linearly at the rate $(U_i-u_{cb})/L$, the inductor continues to store energy, and the filter capacitor $C_{fa}$ maintains the load current $i_a$.

Interval II: the energy releasing switches $S_{a2}$、$S_{b1}$ and $S_{c1}$ are turned off, $S_{a1}$ is turned on, and the state of the switches are in the order of mode II-1, II-2, II-3 and II-4 in each high-frequency switch cycle $T_S$ in this interval.

Figure 22:
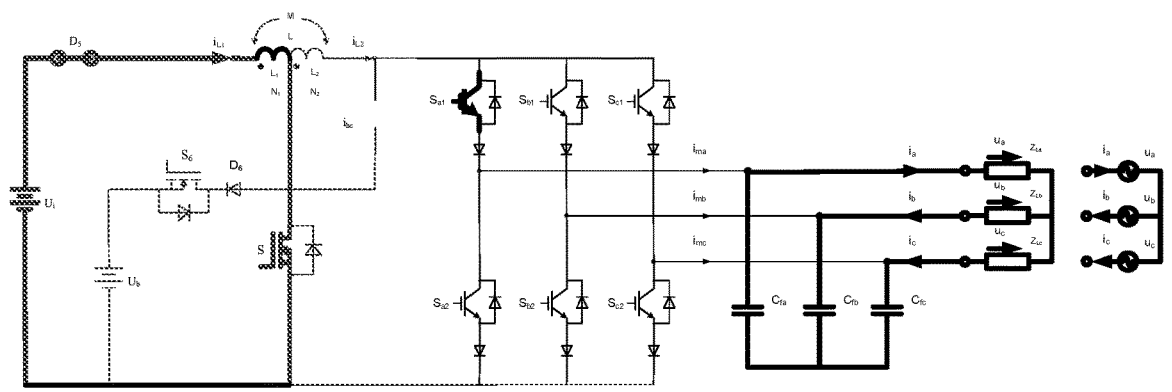
FIG. 22 shows an equivalent circuit of the mode II-1 and mode II-3 of the single-stage three-phase high-gain boost-type three-port integrated inverter in power supply mode 1 where $D_5$, S, $S_{a1}$ are turned on and $S_{a2}$, $S_{b1}$, $S_{c1}$, $S_{b2}$, $S_{c2}$ are turned off.

The mode II-1 is shown in FIG. 22: $D_5$, S, $S_{a1}$ are turned on, and $S_{a2}$, $S_{b1}$, $S_{c1}$, $S_{b2}$, $S_{c2}$ are turned off. The voltage source $U_i$, the inductor $L_1$ and the energy storage switch S form a loop. The inductor stores energy. The inductor current $i_{L1}$ rises linearly at the rate $U_i/L_1$. The filter capacitors $C_{fa}$, $C_{fb}$, $C_{fc}$ maintain the load currents $i_a$, $i_b$, $i_c$.

Figure 23:
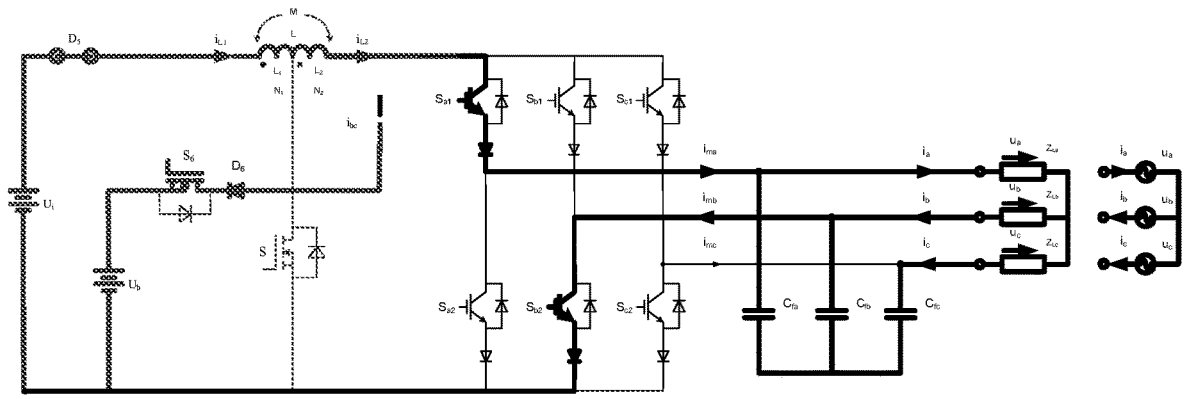
FIG. 23 shows an equivalent circuit of the mode II-2 of the single-stage three-phase high-gain boost-type three-port integrated inverter in power supply mode 1 where $D_5$, $D_6$, $S_6$, $S_{b2}$, $S_{a1}$ are turned on and $S_{a2}$, $S_{b1}$, $S_{c1}$, S, $S_{c2}$ are turned off.

The mode II-2 is shown in FIG. 23: $D_5$, $D_6$, $S_6$, $S_{b2}$, $S_{a1}$ are turned on, and $S_{a2}$, $S_{b1}$, $S_{c1}$, S, $S_{c2}$ are turned off. The voltage source $U_i$, the energy storage inductor L, and the energy releasing switches Sal and $S_{b2}$ or the charging subcircuit switch of the battery form a loop, and the inverter transmits energy to the load or charges the battery. If $u_{ab}>U_i$, the inductor current $i_{L2}$ decreases linearly at the rate $(u_{ab}-U_i)/L$ or $(U_b-U_i)/L$, and the inductor releases energy. If $u_{ab}<U_i$, the inductor current $i_{L2}$ increases linearly at the rate $(U_i-u_{ab})/L$, the inductor continues to store energy, and the filter capacitor $C_{fc}$ maintains the load current $i_c$.

Mode II-3 is the same as mode II-1, as shown in FIG. 22.

Figure 24:
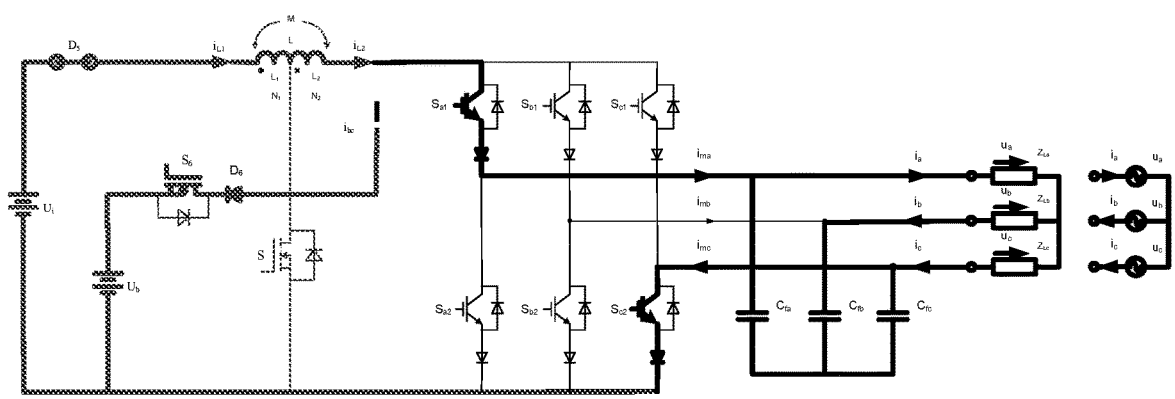
FIG. 24 shows an equivalent circuit of the mode II-4 of the single-stage three-phase high-gain boost-type three-port integrated inverter in power supply mode 1 where $D_5$, $D_6$, $S_6$, $S_{c2}$, $S_{a1}$ are turned on and $S_{a2}$, $S_{b1}$, $S_{c1}$, S, $S_{b2}$ are turned off.

The mode II-4 is shown in FIG. 24: $D_5$, $D_6$, $S_6$, $S_{c2}$, $S_{a1}$ are turned on, and $S_{a2}$, $S_{b1}$, $S_{c1}$, S, $S_{b2}$ are turned off. The voltage source $U_i$, the energy storage inductor L, and the energy releasing switches $S_{a1}$ and $S_{c2}$ or the charging subcircuit switch of the battery form a loop, and the inverter transmits energy to the load or charges the battery. If $u_{ac}>U_i$, the inductor current $i_{L2}$ decreases linearly at the rate $(u_{ac}-U_i)/L$ or $(U_b-U_i)/L$, and the inductor releases energy. If $u_{ac}<U_i$, the inductor current $i_{L2}$ increases linearly at the rate $(U_i-u_{ac})/L$, the inductor continues to store energy, and the filter capacitor $C_{fb}$ maintains the load current $i_b$.

Interval III: the energy releasing switches $S_{a2}$. $S_{b2}$ and $S_{c1}$ are turned off, $S_{c2}$ is turned on, and the state of the switches are in the order of mode III-2, III-3 and III-4 in each high-frequency switch cycle $T_S$ in this interval.

Figure 25:
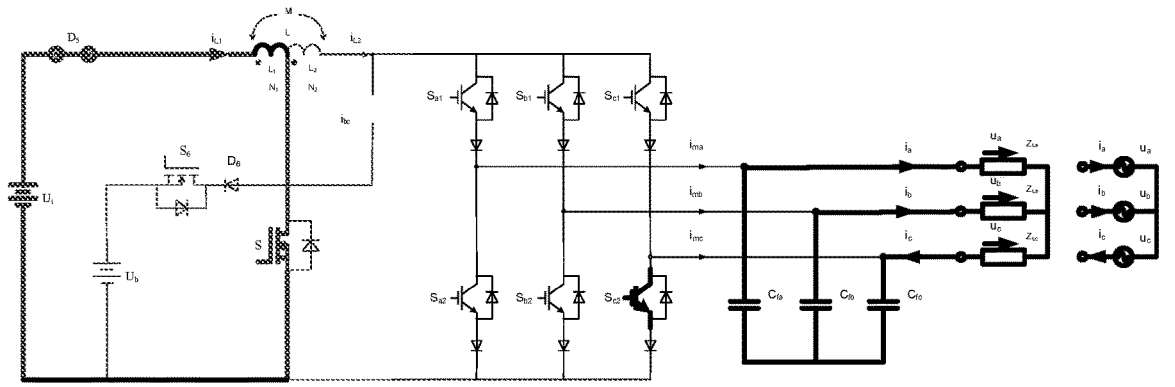
FIG. 25 shows an equivalent circuit of the mode III-1 and mode III-3 of the single-stage three-phase high-gain boost-type three-port integrated inverter in power supply mode 1 where $D_5$, S, $S_{c2}$ are turned on and $S_{a2}$, $S_{b2}$, $S_{c1}$, $S_{a1}$, $S_{b1}$ are turned off.

The mode III-1 is shown in FIG. 25: $D_5$, S, $S_{c2}$ are turned on, $S_{a2}$, $S_{b2}$, $S_{c1}$, $S_{a1}$, $S_{b1}$ are turned off. The voltage source $U_i$, the inductor $L_1$, and the energy storage switch S form a loop. The inductor $L_1$ stores energy. The inductor current $i_{L1}$ rises linearly at the rate $U_i/L_1$. The filter capacitors $C_{fa}$, $C_{fb}$, $C_{fc}$ maintain the load currents $i_a$, $i_b$, $i_c$.

Figure 26:
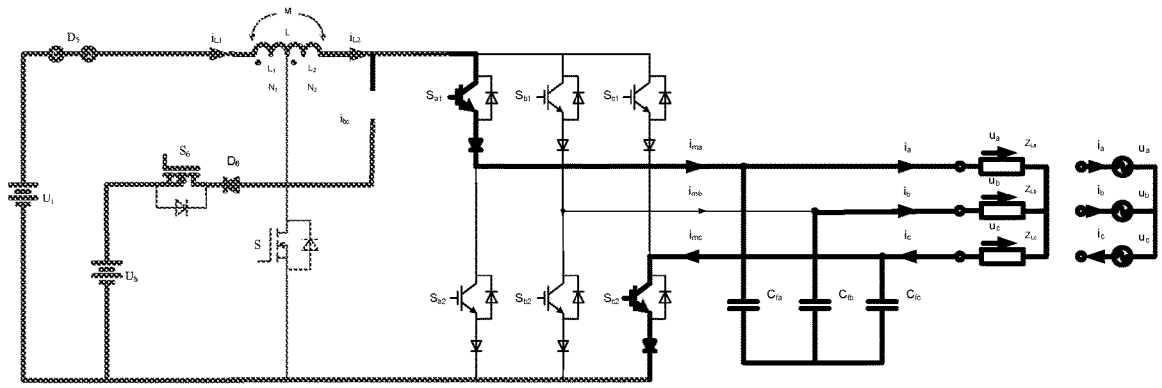
FIG. 26 shows an equivalent circuit of the mode III-2 of the single-stage three-phase high-gain boost-type three-port integrated inverter in power supply mode 1 where $D_5$, $D_6$, $S_6$, $S_{a1}$, $S_{c2}$ are turned on and $S_{a2}$, $S_{b2}$, $S_{c1}$, S, Sib are turned off.

The mode III-2 is shown in FIG. 26: $D_5$, $D_6$, $S_6$, $S_{a1}$, $S_{c2}$ are turned on, $S_{a2}$, $S_{b2}$, $S_{c1}$, S, $S_{b1}$ are turned off. The voltage source $U_i$, the energy storage inductor L, and the energy releasing switches $S_{a1}$ and $S_{c2}$ or the charging subcircuit switch of the battery form a loop, and the inverter transmits energy to the load or charges the battery. If $u_{ac}>U_i$, the inductor current $i_{L2}$ decreases linearly at the rate $(u_{ac}-U_i)/L$ or $(U_b-U_i)/L$, and the inductor releases energy. If $u_{ac}<U_i$, the inductor current $i_{L2}$ increases linearly at the rate $(U_i-u_{ac})/L$, the inductor continues to store energy, and the filter capacitor $C_{fb}$ maintains the load current $i_b$.

Mode III-3 is the same as mode as shown in FIG. 25.

Figure 27:
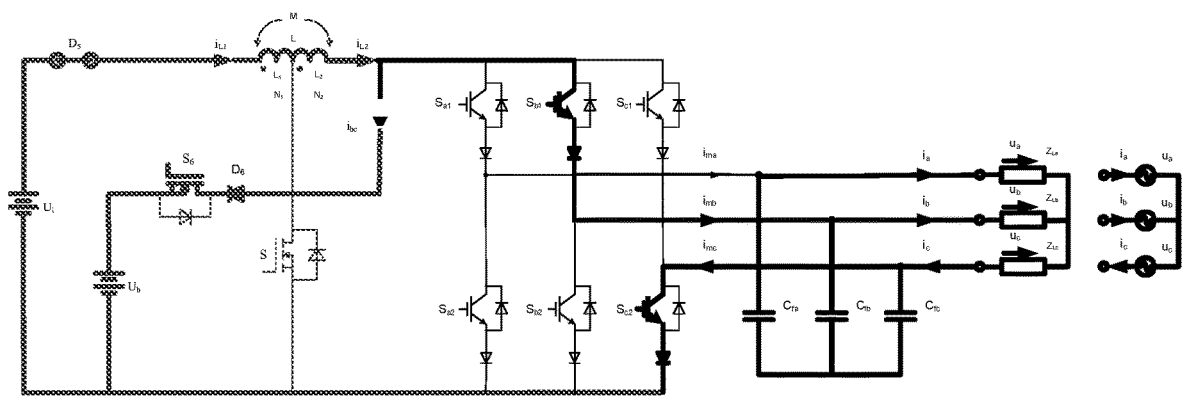
FIG. 27 shows an equivalent circuit of the mode III-4 of the single-stage three-phase high-gain boost-type three-port integrated inverter in power supply mode 1 where $D_5$, $D_6$, $S_6$, $S_{b1}$, $S_{c2}$ are turned on and $S_{a2}$, $S_{b2}$, $S_{c1}$, S, $S_{a1}$ are turned off.

The mode III-4 is shown in FIG. 27: $D_5$, $D_6$, $S_6$, $S_{b1}$, $S_{c2}$ are turned on, $S_{a2}$, $S_{b2}$, $S_{c1}$, S, $S_{a1}$ are turned off. The voltage source $U_i$, the energy storage inductor L, and the energy releasing switches $S_{b1}$ and $S_{c2}$ or the charging subcircuit switch of the battery form a loop, and the inverter transmits energy to the load or charges the battery. If $u_{bc}>U_i$, the inductor current $i_{L2}$ decreases linearly at the rate $(u_{bc}-U_i)/L$ or $(U_b-U_i)/L$, and the inductor releases energy. If $u_{bc}<U_i$, the inductor current $i_{L2}$ increases linearly at the rate $(U_i-u_{bc})/L$, the inductor continues to store energy, and the filter capacitor $C_{fa}$ maintains the load current $i_a$.

Interval IV: the energy releasing switches $S_{a1}$, $S_{b2}$ and $S_{c1}$ are turned off, $S_{b1}$ is turned on, and the state of the switches are in the order of mode IV-1, IV-2, IV-3 and IV-4 in each high-frequency switch cycle $T_S$ in this interval.

Figure 28:
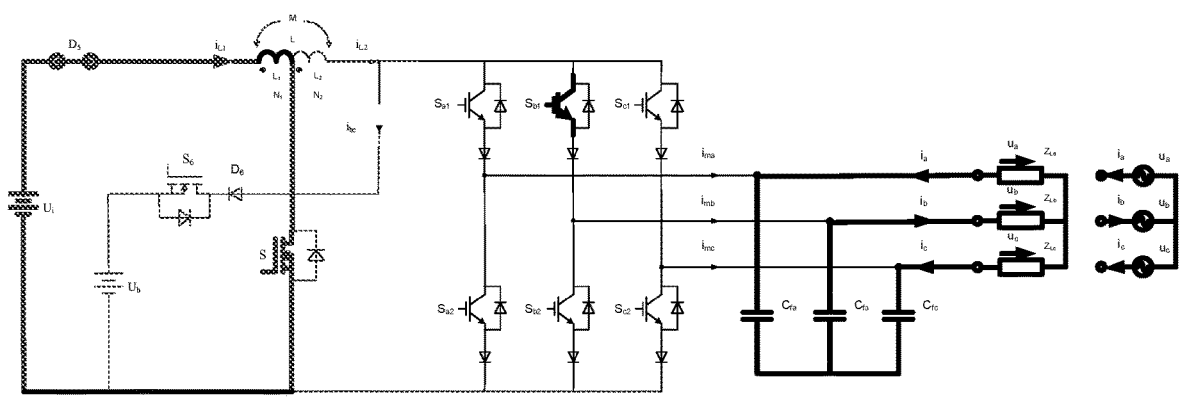
FIG. 28 shows an equivalent circuit of the mode IV-1 and mode IV-3 of the single-stage three-phase high-gain boost-type three-port integrated inverter in power supply mode 1 where $D_5$, S, $S_{b1}$ are turned on and $S_{a1}$, $S_{b2}$, $S_{c1}$, $S_{a2}$, $S_{c2}$ are turned off.

The mode IV-1 is shown in FIG. 28: $D_5$, S, $S_{b1}$ are turned on, and $S_{a1}$, $S_{b2}$, $S_{c1}$, $S_{a2}$, $S_{c2}$ are turned off. The voltage source $U_i$, the inductor $L_1$ and the energy storage switch S form a loop. The inductor $L_1$ stores energy. The inductor current $i_{L1}$ rises linearly at the rate $U_i/L_1$. The filter capacitors $C_{fa}$, $C_{fb}$, $C_{fc}$ maintain the load currents $i_a$, $i_b$, $i_c$.

Figure 29:
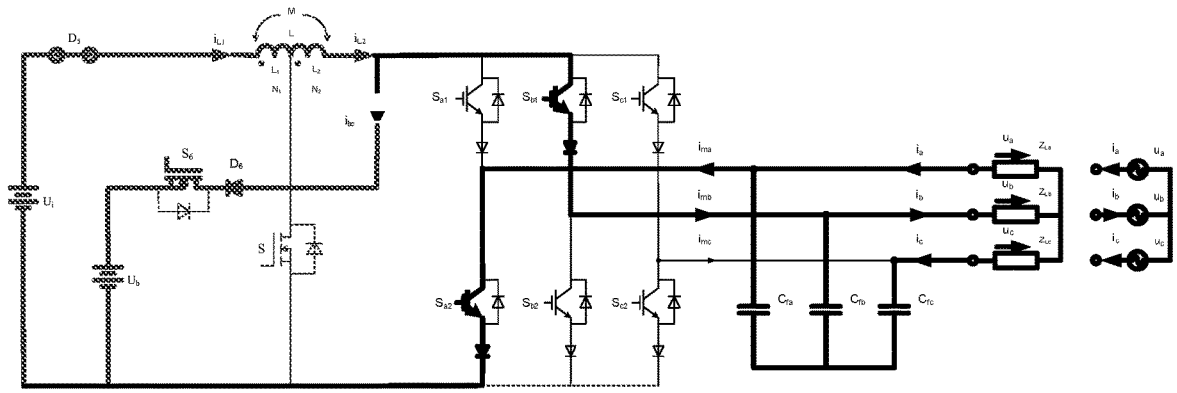
FIG. 29 shows an equivalent circuit of the mode IV-2 of the single-stage three-phase high-gain boost-type three-port integrated inverter in power supply mode 1 where $D_5$, $D_6$, $S_6$, $S_{a2}$, $S_{b1}$ are turned on and $S_{a1}$, $S_{b2}$, $S_{c1}$, S, $S_{c2}$ are turned off.

The mode IV-2 is shown in FIG. 29: $D_5$, $D_6$, $S_6$, $S_{a2}$, $S_{b1}$ are turned on, $S_{a1}$, $S_{b2}$, $S_{c1}$, S, $S_{c2}$ are turned off. The voltage source $U_i$, the energy storage inductor L, and the energy releasing switches $S_{b1}$ and $S_{a2}$ or the charging subcircuit switch of the battery form a loop, and the inverter transmits energy to the load or charges the battery. If $u_{ba}>U_i$, the inductor current $i_{L2}$ decreases linearly at the rate $(u_{ba}-U_i)/L$ or $(U_b-U_i)/L$, and the inductor releases energy. If $u_{ba}<U_i$, the inductor current $i_{L2}$ increases linearly at the rate $(U_i-u_{ba})/L$, the inductor continues to store energy, and the filter capacitor $C_{fc}$ maintains the load current $i_c$.

Mode IV-3 is the same as mode IV-1, as shown in FIG. 28.

Figure 30:
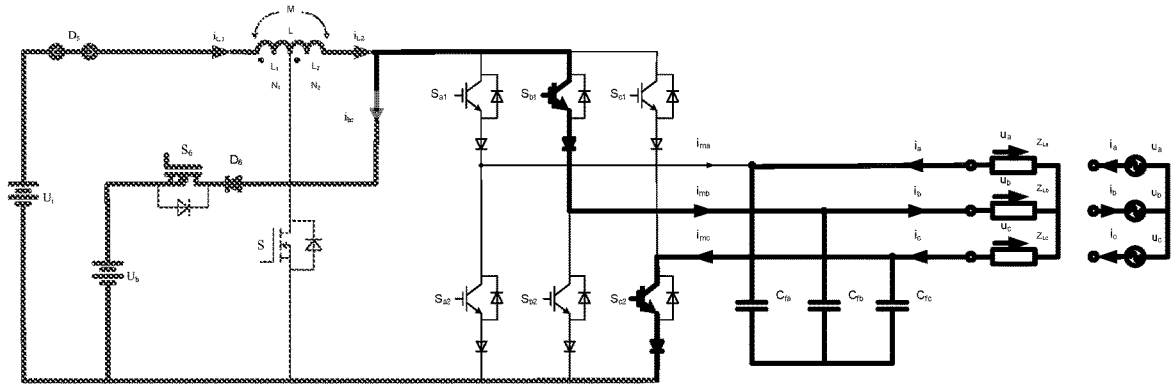
FIG. 30 shows an equivalent circuit of the mode IV-4 of the single-stage three-phase high-gain boost-type three-port integrated inverter in power supply mode 1 where $D_5$, $D_6$, $S_6$, $S_{c2}$, $S_{b1}$ are turned on and $S_{a1}$, $S_{b2}$, $S_{c1}$, S, $S_{a2}$ are turned off.

The mode IV-4 is shown in FIG. 30: $D_5$, $D_6$, $S_6$, $S_{c2}$, $S_{b1}$ are turned on, and $S_{a1}$, $S_{b2}$, $S_{c1}$, S, $S_{a2}$ are turned off. The voltage source $U_i$, the energy storage inductor L, and the energy releasing switches $S_{b1}$ and $S_{c2}$ or the charging subcircuit switch of the battery form a loop, and the inverter transmits energy to the load or charges the battery. If $u_{bc}>U_i$, the inductor current $i_{L2}$ decreases linearly at the rate $(u_{bc}-U_i)/L$ or $(U_b-U_i)/L$, and the inductor releases energy. If $u_{bc}<U_i$, the inductor current $i_{L2}$ increases linearly at the rate $(U_i-u_{bc})/L$, the inductor continues to store energy, and the filter capacitor $C_{fa}$ maintains the load current $i_a$.

Interval V: the energy releasing switches $S_{a1}$, $S_{b2}$ and $S_{c2}$ are turned off, $S_{a2}$ is turned on, and the state of the switches are in the order of mode V-1, V-2, V-3 and V-4 in each high-frequency switch cycle $T_S$ in this interval.

Figure 31:
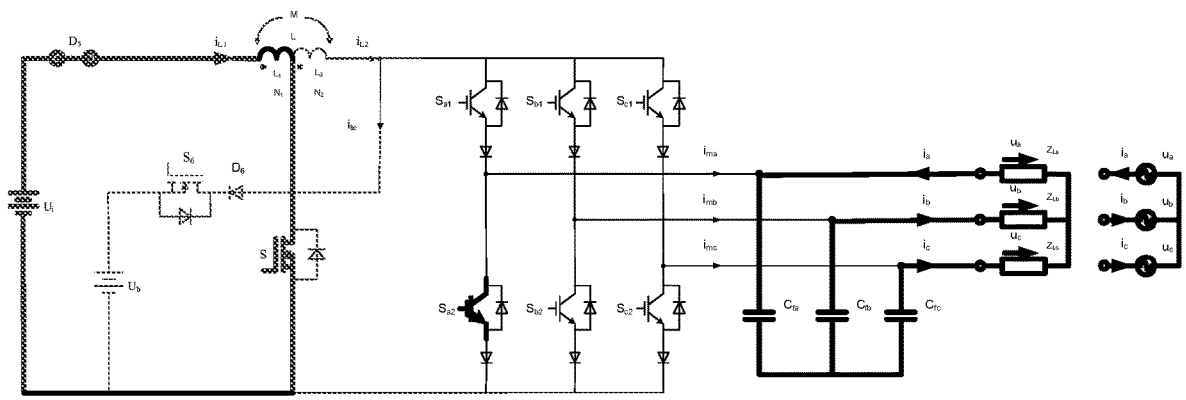
FIG. 31 shows an equivalent circuit of the mode V-1 and mode V-3 of the single-stage three-phase high-gain boost-type three-port integrated inverter in power supply mode 1 where $D_5$, S, $S_{a2}$ are turned on and $S_{a1}$, $S_{b2}$, $S_{c2}$, $S_{b1}$, $S_{c1}$ are turned off.

The mode V-1 is shown in FIG. 31: $D_5$, S, $S_{a2}$ are turned on, and $S_{a1}$, $S_{b2}$, $S_{c2}$, $S_{b1}$, $S_{c1}$ are turned off. The voltage source $U_i$, the inductor $L_1$ and the energy storage switch S form a loop. The inductor $L_1$ stores energy. The inductor current $i_{L1}$ rises linearly at the rate $U_i/L_1$. The filter capacitors $C_{fa}$, $C_{fb}$, $C_{fc}$ maintain the load currents $i_a$, $i_b$, $i_c$.

Figure 32:
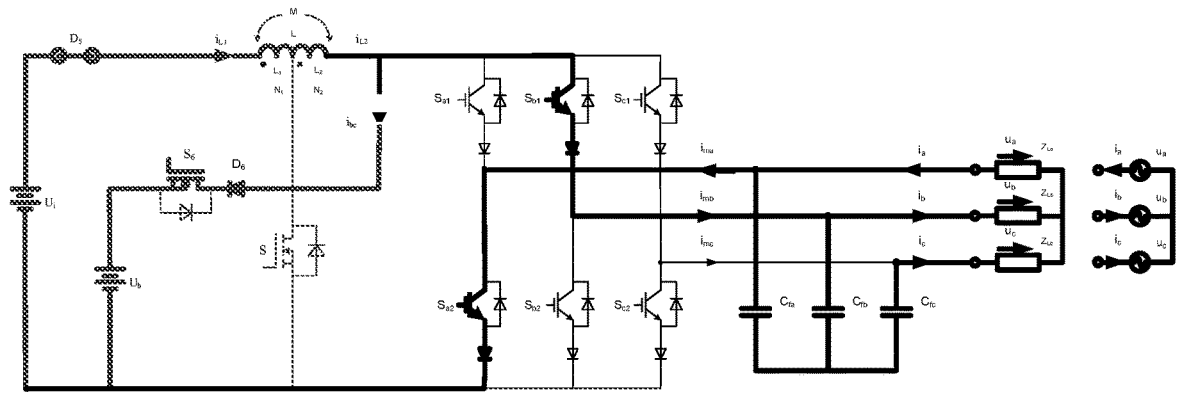
FIG. 32 shows an equivalent circuit of the mode V-2 of the single-stage three-phase high-gain boost-type three-port integrated inverter in power supply mode 1 where $D_5$, $D_6$, $S_6$, $S_{b1}$, $S_{a2}$ are turned on and $S_{a1}$, $S_{b2}$, $S_{c2}$, S, $S_{c1}$ are turned off.

The mode V-2 is shown in FIG. 32: $D_5$, $D_6$, $S_6$, $S_{b1}$, $S_{a2}$ are turned on, and $S_{a1}$, $S_{b2}$, $S_{c2}$, S, $S_{c1}$ are turned off. The voltage source $U_i$, the energy storage inductor L, and the energy releasing switches $S_{b1}$ and $S_{a2}$ or the charging subcircuit switch of the battery form a loop, and the inverter transmits energy to the load or charges the battery. If $u_{ba}>U_i$, the inductor current $i_{L2}$ decreases linearly at the rate $(u_{ba}-U_i)/L$ or $(U_b-U_i)/L$, and the inductor releases energy. If $u_{ba}<U_i$, the inductor current $i_{L2}$ increases linearly at the rate $(U_i-u_{ba})/L$, the inductor continues to store energy, and the filter capacitor $C_{fc}$ maintains the load current $i_c$.

Mode V-3 is the same as mode V-1, as shown in FIG. 31.

Figure 33:
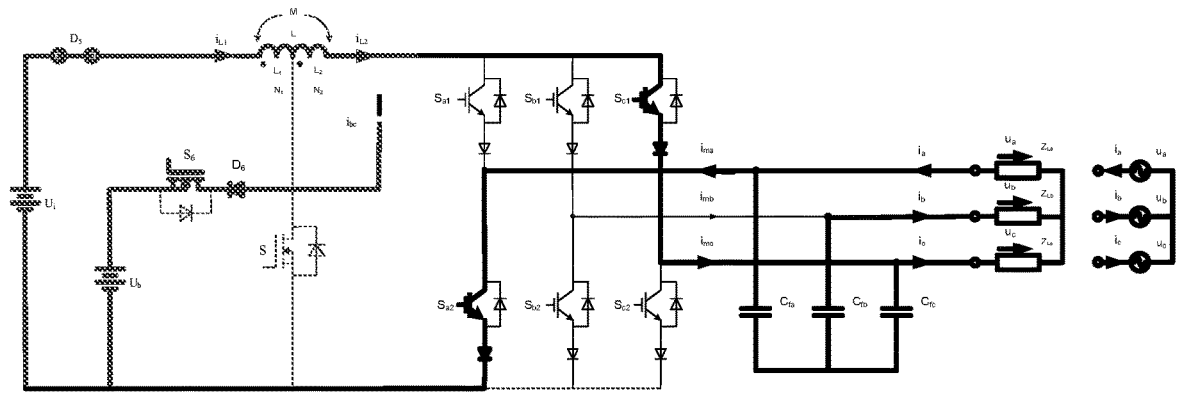
FIG. 33 shows an equivalent circuit of the mode V-4 of the single-stage three-phase high-gain boost-type three-port integrated inverter in power supply mode 1 where $D_5$, $D_6$, $S_6$, $S_{c1}$, $S_{a2}$ are turned on and $S_{a1}$, $S_{b2}$, $S_{c2}$, S, Sib are turned off.

The mode V-4 is shown in FIG. 33: $D_5$, $D_6$, $S_6$, $S_{c1}$, $S_{a2}$ are turned on, $S_{a1}$, $S_{b2}$, $S_{c2}$, S, $S_{b1}$ are turned off. The voltage source $U_i$, the energy storage inductor L, the energy releasing switches $S_{c1}$ and $S_{a2}$ or the charging subcircuit switch of the battery form a loop, and the inverter transmits energy to the load or charges the battery. If $u_{ca}>U_i$, the inductor current $i_{L2}$ decreases linearly at the rate $(u_{ca}-U_i)/L$ or $(U_b-U_i)/L$, and the inductor releases energy. If $u_{ca}<U_i$, the inductor current $i_{L2}$ increases linearly at the rate $(U_i-u_{ca})/L$, the inductor continues to store energy, and the filter capacitor $C_{fb}$ maintains the load current $i_b$.

Interval VI: the energy releasing switches $S_{a1}$, $S_{b1}$ and $S_{c2}$ are turned off, $S_{c1}$ is turned on, and the state of the switches are in the order of mode VI-1, VI-2, VI-3 and VI-4 in each high-frequency switch cycle $T_S$ in this interval.

Figure 34:
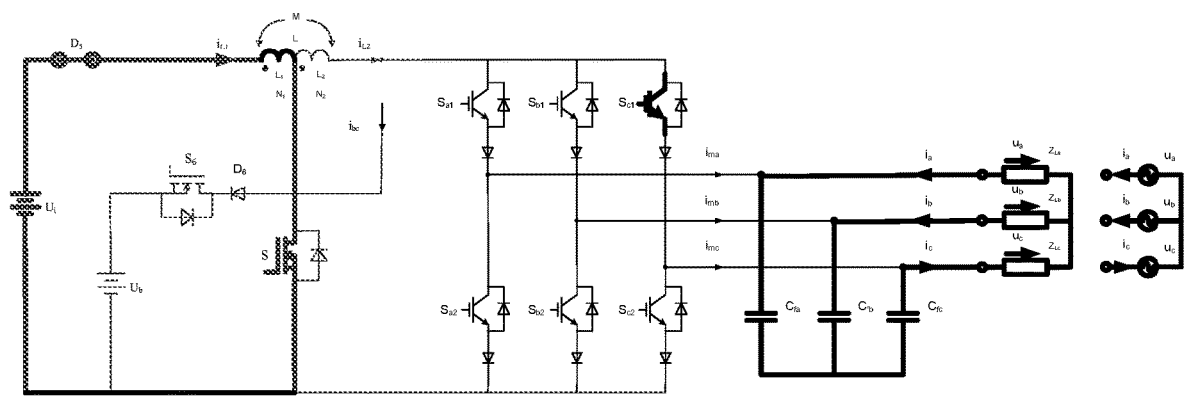
FIG. 34 shows an equivalent circuit of the mode VI-1 and mode VI-3 of the single-stage three-phase high-gain boost-type three-port integrated inverter in power supply mode 1 where $D_5$, S, $S_{c1}$ are turned on and $S_{a1}$, $S_{b1}$, $S_{c2}$, $S_{a2}$, $S_{b2}$ are turned off.

The mode VI-1 is shown in FIG. 34: $D_5$, S, $S_{c1}$ are turned on, and $S_{a1}$, $S_{b1}$, $S_{c2}$, $S_{a2}$, $S_{b2}$ are turned off. The voltage source $U_i$, the inductor $L_1$ and the energy storage switch S form a loop. The inductor $L_1$ stores energy. The inductor current $i_{L1}$ rises linearly at the rate WU. The filter capacitors $C_{fa}$, $C_{fb}$, $C_{fc}$ maintain the load currents $i_a$, $i_b$, $i_c$.

Figure 35:
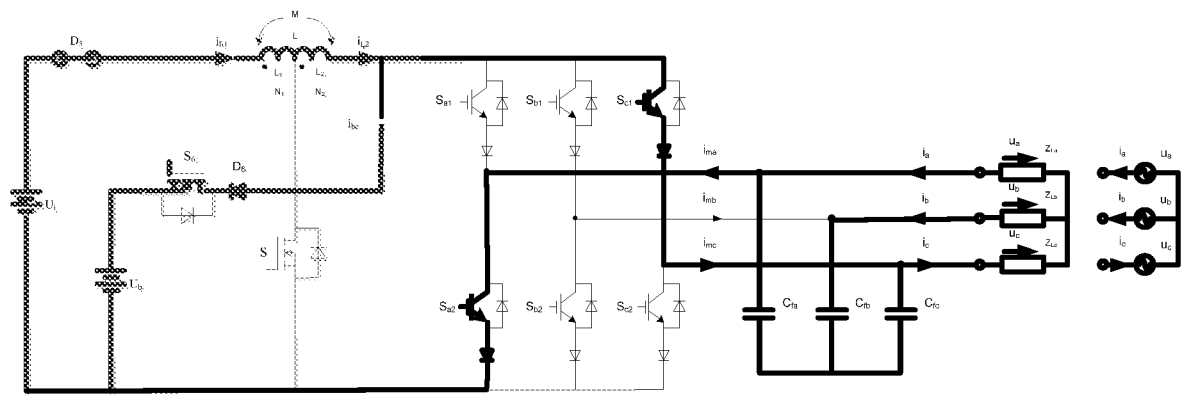
FIG. 35 shows an equivalent circuit of the mode VI-2 of the single-stage three-phase high-gain boost-type three-port integrated inverter in power supply mode 1 where $D_5$, $D_6$, $S_6$, $S_{a2}$, $S_{c1}$ are turned on and $S_{a1}$, $S_{b1}$, $S_{c2}$, S, $S_{b2}$ are turned off.

The mode VI-2 is shown in FIG. 35: $D_5$, $D_6$, $S_6$, $S_{a2}$, $S_{c1}$ are turned on, and $S_{a1}$, $S_{b1}$, $S_{c2}$, S, $S_{b2}$ are turned off. The voltage source $U_i$, the energy storage inductor L, and the energy releasing switches $S_{c1}$ and $S_{a2}$ or the charging subcircuit switch of the battery form a loop, and the inverter transmits energy to the load or charges the battery. If $u_{ca}>U_i$, the inductor current $i_{L2}$ decreases linearly at the rate $(u_{ca}-U_i)/L$ or $(U_b-U_i)/L$, and the inductor releases energy. If $u_{ca}<U_i$, the inductor current $i_{L2}$ increases linearly at the rate $(U_i-u_{ca})/L$, the inductor continues to store energy, and the filter capacitor $C_{fb}$ maintains the load current $i_b$.

Mode VI-3 is the same as mode VI-1, as shown in FIG. 34.

Figure 36:
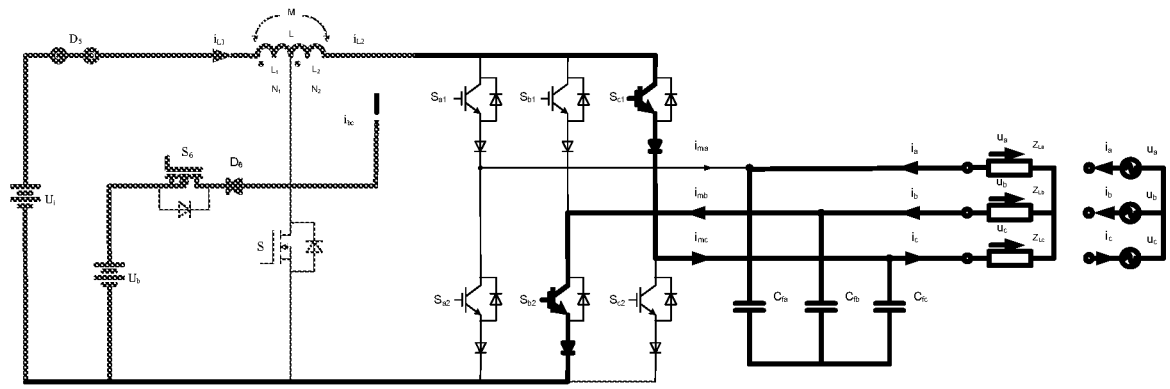
FIG. 36 shows an equivalent circuit of the mode VI-4 of the single-stage three-phase high-gain boost-type three-port integrated inverter in power supply mode 1 where $D_5$, $D_6$, $S_6$, $S_{b2}$, $S_{c1}$ are turned on and $S_{a1}$, $S_{b1}$, $S_{c2}$, S, $S_{a2}$ are turned off.

The mode VI-4 is shown in FIG. 36: $D_5$, $D_6$, $S_6$, $S_{b2}$, $S_{c1}$ are turned on, $S_{a1}$, $S_{b1}$, $S_{c2}$, S, $S_{a2}$ are turned off. The voltage source $U_i$, the energy storage inductor L, and the energy releasing switches $S_{c1}$ and $S_{b2}$ or the charging subcircuit switch of the battery form a loop, and the inverter transmits energy to the load or charges the battery. If $u_{cb}>U_i$, the inductor current $i_{L2}$ decreases linearly at the rate $(u_{cb}-U_i)/L$ or $(U_b-U_i)/L$, and the inductor releases energy. If $u_{cb}<U_i$, the inductor current $i_{L2}$ increases linearly at the rate $(U_i-u_{cb})/L$, the inductor continues to store energy, and the filter capacitor $C_{fa}$ maintains the load current $i_a$.

What is claimed is:

1. A single-stage three-phase high-gain boost-type three-port integrated inverter, comprising a center-tapped energy storage inductor, an energy storage switch, a three-phase inverter bridge, and a three-phase filter; wherein the center-tapped energy storage inductor, the three-phase inverter bridge, and the three-phase filter are successively connected in cascade, a drain terminal and a source terminal of the storage switch are respectively connected to the center tap of the energy storage inductor and a negative electrode of an input DC power source; a battery charging/discharging switch unit is connected between a positive electrode of the input DC power source, a positive electrode of a battery and two ends of the center-tapped energy storage inductor; the battery charging/discharging switch unit comprises a charging subcircuit switch, a discharging subcircuit switch, and a blocking diode; an anode and a cathode of a charging subcircuit diode are respectively connected to a right end of the center-tapped energy storage inductor and a drain terminal of the charging subcircuit switch; a source terminal of the charging subcircuit switch is connected to a drain terminal of the discharging subcircuit switch and a positive electrode of the battery; a source terminal of the discharging subcircuit switch is connected to a cathode of the blocking diode and a left end of the center-tapped energy storage inductor; an anode of the blocking diode is connected to the positive electrode of the input DC power source; a negative electrode of the battery is connected to the negative electrode of the input DC power source; the blocking diode is configured to avoid a short circuit between the battery and the input DC power source circuit when the discharging subcircuit switch is turned on, and a terminal voltage $U_b$ of the battery is greater than a voltage $U_i$ of the input DC power source; the voltage $U_i$ of the input DC power source or the terminal voltage $U_b$ of the battery, a left part inductor $L_1$ of the center-tapped energy storage inductor L, and the energy storage switch form a magnetizing loop; the voltage $U_i$ of the input DC power source or the terminal voltage $U_b$ of the battery, the center-tapped energy storage inductor L, one of the line-to-line voltage loops of the three-phase inverter bridge having an instantaneous value of a line-to-line voltage not less than $(\sqrt{6}/2)U_p$ or the charging subcircuit switch, and the battery form a demagnetizing loop; wherein $U_p$ is an RMS line-to-neutral voltage of a three-phase output; the three-phase inverter bridge comprises two-quadrant power switches configured to withstand bidirectional voltage stress and unidirectional current stress; a maximum voltage gain of the inverter is $(1+dN_2/N_1)/(1-d)$, wherein, d is a duty ratio of the inverter varying according to a sine law, and $N_1$ and $N_2$ respectively are number of turns of a left part and a right part windings of the center-tapped energy storage inductor L; the inverter has an input port, an output port, and an intermediate port for energy storage composed of the charging/discharging switch unit of the battery; the inverter has three power supply modes including a first mode, a second mode and a third mode; in the first mode, the input DC power source supplies power to the output load and the battery; in the second mode, the input DC power source and the battery supply power to the output load; and in the third mode, the battery supplies power to the load; the first mode, the second mode and the three mode are respectively equivalent to a single-input double-output converter, a double-input single-output inverter with parallel connection and time-phased supplying power and a single-input single-output inverter; the inverter employs an energy management and control strategy including a master-slave load sharing for photovoltaic cells and the battery, a double-loop improved separate zone SPWM with an outer RMS output voltage loop of the inverter with a maximum power point tracking of the photovoltaic cells and an inner current loop of the energy storage inductor, and the inverter is configured to be switched smoothly and seamlessly among the three power supply modes.

* * * * *